(12) United States Patent  (10) Patent No.: US 8,115,460 B2
Kalechshtein  (45) Date of Patent: Feb. 14, 2012

(54) POWER CONVERSION WITH ZERO VOLTAGE SWITCHING

(76) Inventor: Moshe Kalechshtein, Tel Aviv (IL)

( * ) Notice: Subject to any disclaimer, the term of this patent is extended or adjusted under 35 U.S.C. 154(b) by 51 days.

(21) Appl. No.: 12/692,597

(22) Filed: Jan. 23, 2010

(65) Prior Publication Data

US 2011/0181261 A1 Jul. 28, 2011

(51) Int. Cl.
G05F 1/40 (2006.01)
G05F 1/00 (2006.01)

(52) U.S. Cl. .................... 323/235; 323/284
(58) Field of Classification Search ........... 323/235, 323/282, 284–286, 319
See application file for complete search history.

(56) References Cited

U.S. PATENT DOCUMENTS

| | | | |
|---|---|---|---|
| 4,441,146 A * | 4/1984 | Vinciarelli | 363/20 |
| 4,672,303 A * | 6/1987 | Newton | 323/285 |
| 4,758,941 A | 7/1988 | Felton et al. | |
| 4,864,479 A | 9/1989 | Steigerwald et al. | |
| 5,636,114 A | 6/1997 | Bhagwat | |
| 5,909,362 A | 6/1999 | Adams | |
| 6,356,462 B1 | 3/2002 | Jang | |
| 6,392,902 B1 | 5/2002 | Jang | |
| 6,788,033 B2 | 9/2004 | Vinciarelli | |
| 7,154,250 B2 * | 12/2006 | Vinciarelli | 323/240 |
| RE40,072 E * | 2/2008 | Prager et al. | 323/222 |
| 2004/0257272 A1 | 12/2004 | Jacobson | |
| 2007/0258271 A1 | 11/2007 | Meszlenyi | |
| 2008/0055946 A1 * | 3/2008 | Lesso et al. | 363/63 |
| 2008/0232139 A1 * | 9/2008 | Lipcsei et al. | 363/17 |
| 2008/0291711 A1 * | 11/2008 | Williams | 363/131 |

* cited by examiner

*Primary Examiner* — Adolf Berhane
*Assistant Examiner* — Jeffrey Gblende
(74) *Attorney, Agent, or Firm* — Simon Kahn

(57) ABSTRACT

A power converter constituted of: a control circuitry; a first electric coil; a first electronically controlled switch associated with the first electric coil and responsive to the control circuitry, the first electronically controlled switch arranged to charge the first electric coil responsive to a closed state of the first electronically switch; and a second electronically controlled switch arranged to present a substantially short circuit across the first electric coil when the second electronically controlled switch is closed, the second electronically controlled switch responsive to the control circuitry and not arranged to either charge or discharge the first electric coil.

11 Claims, 29 Drawing Sheets

CONTINUOUS MODE SYNCRONOUS BUCK

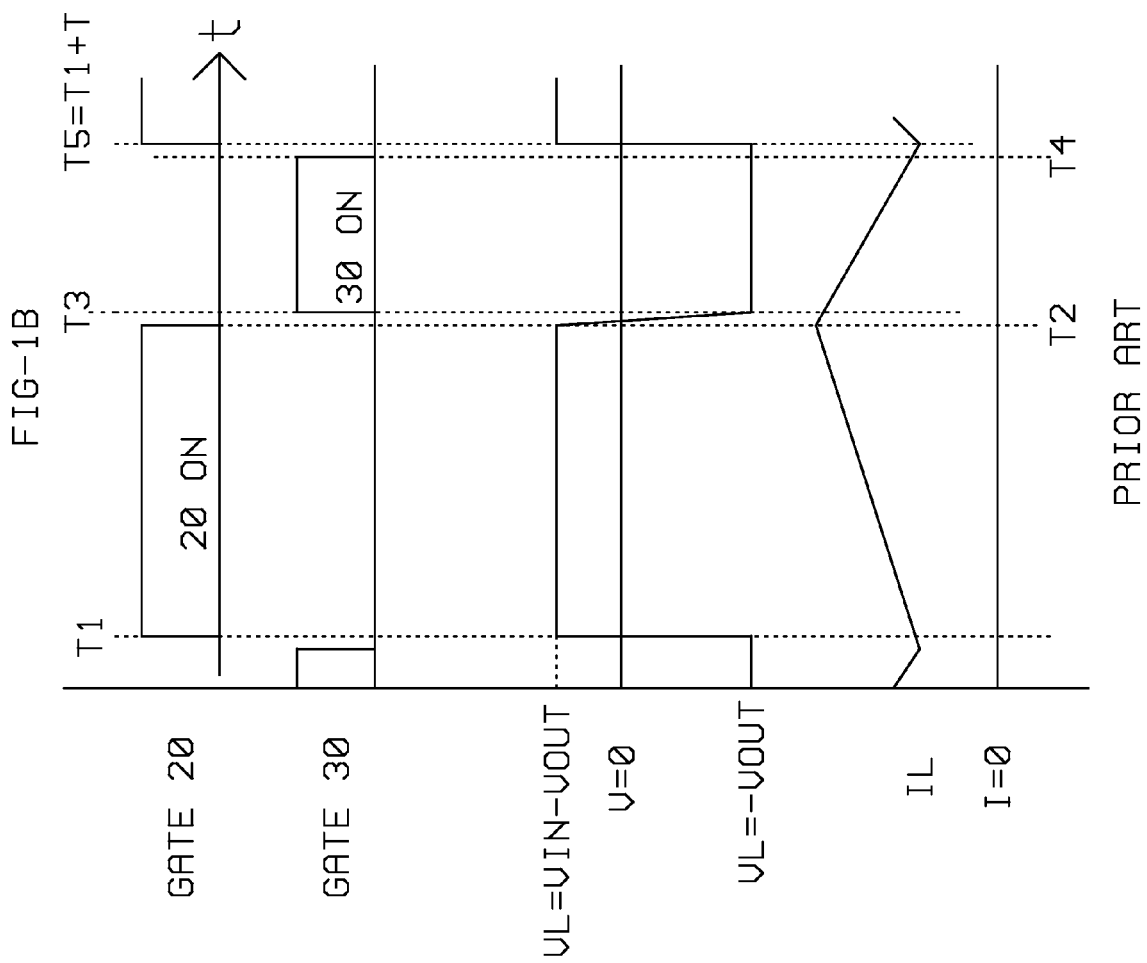

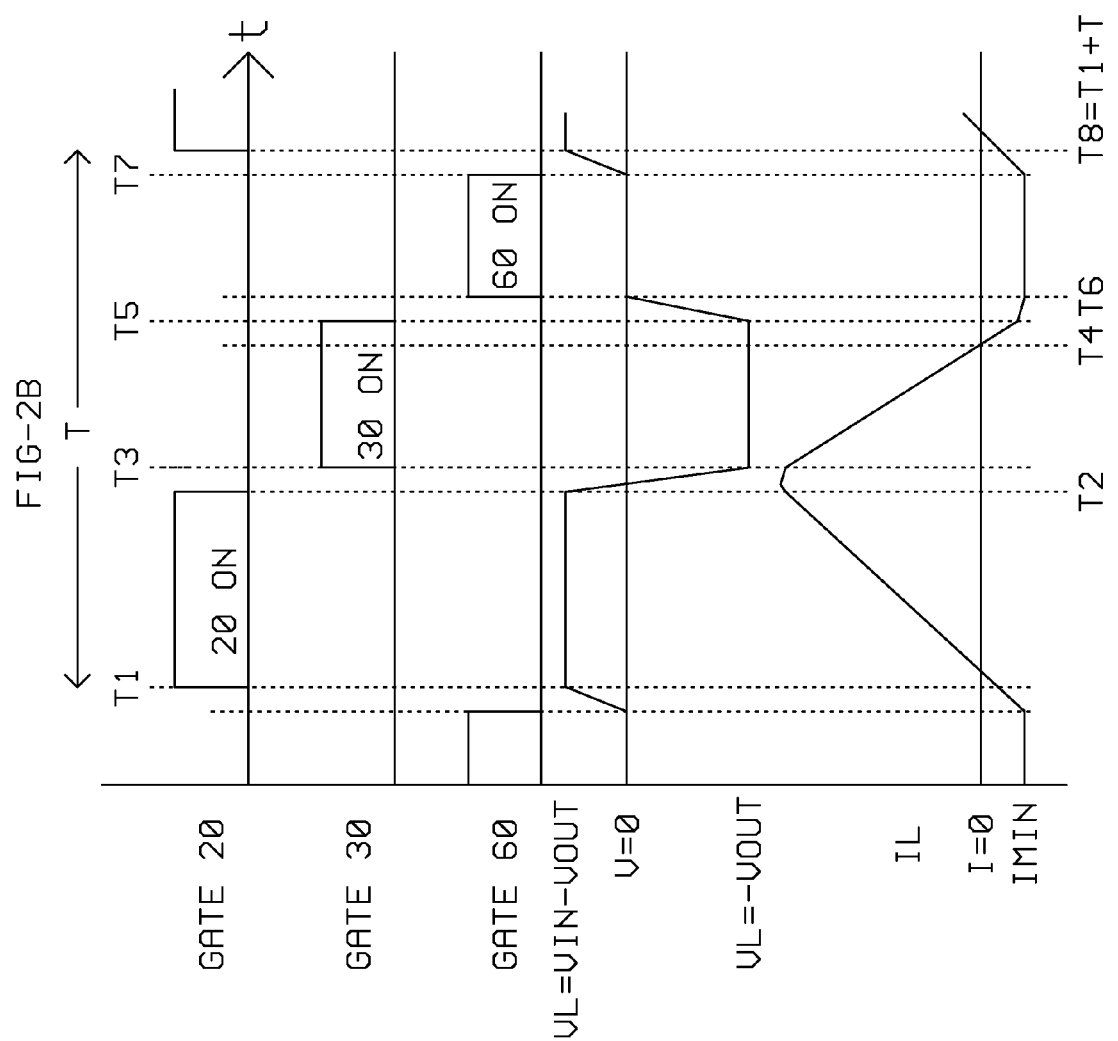

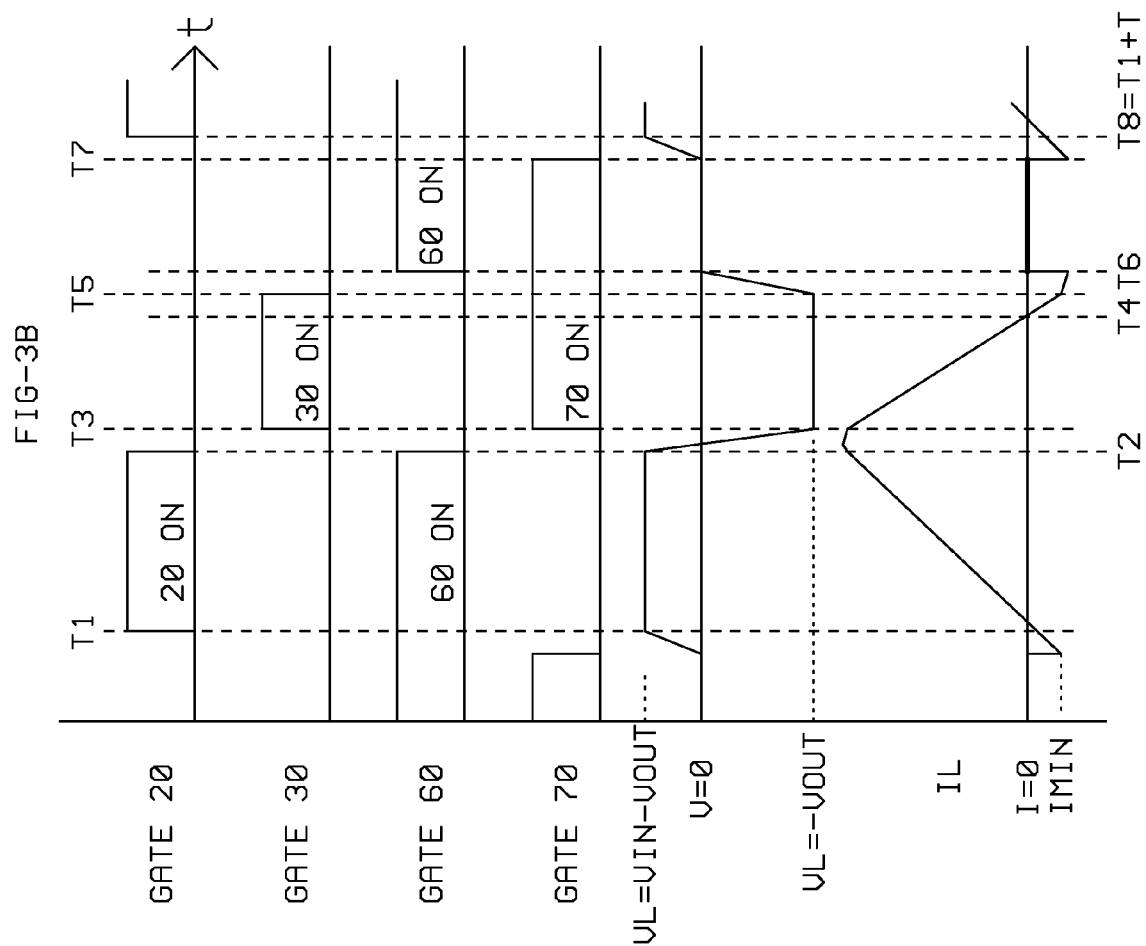

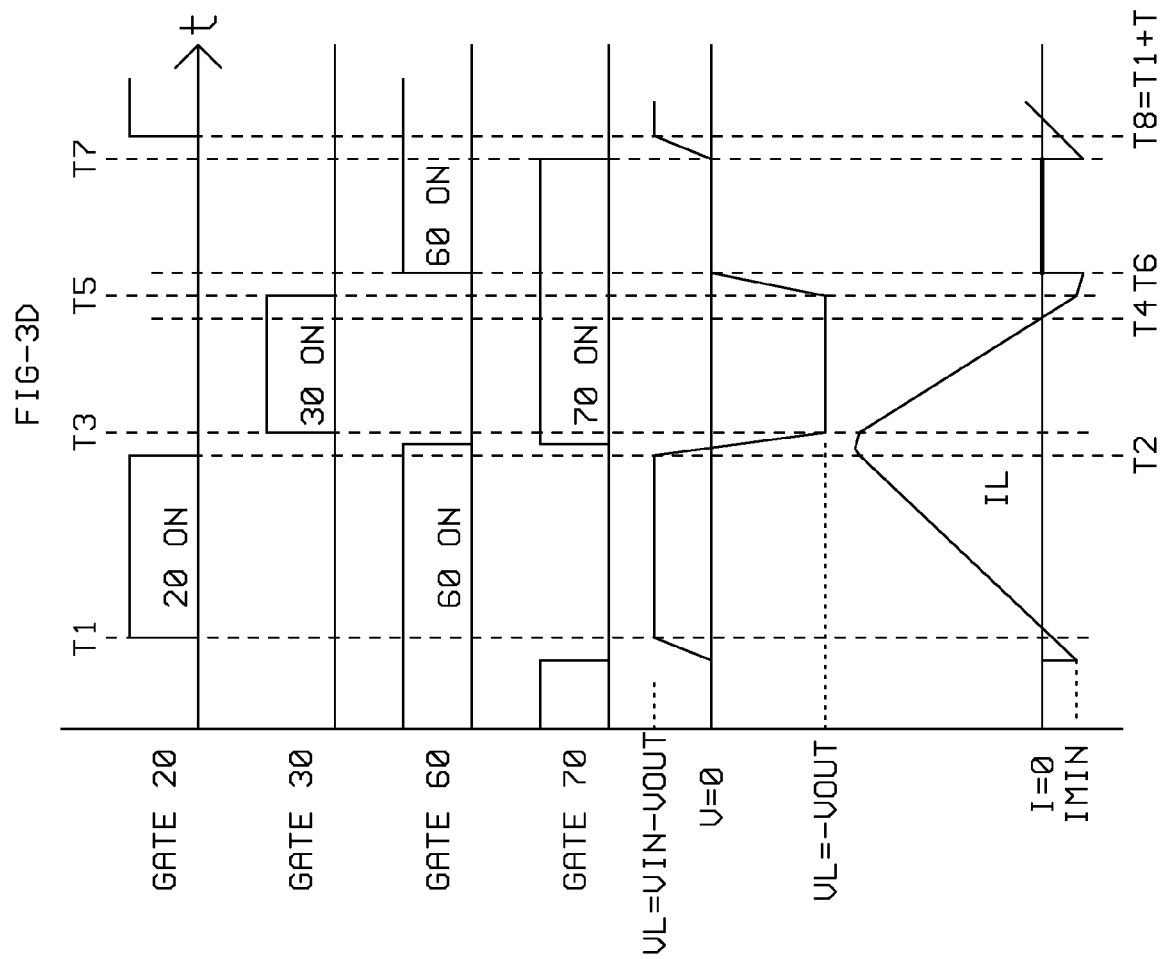

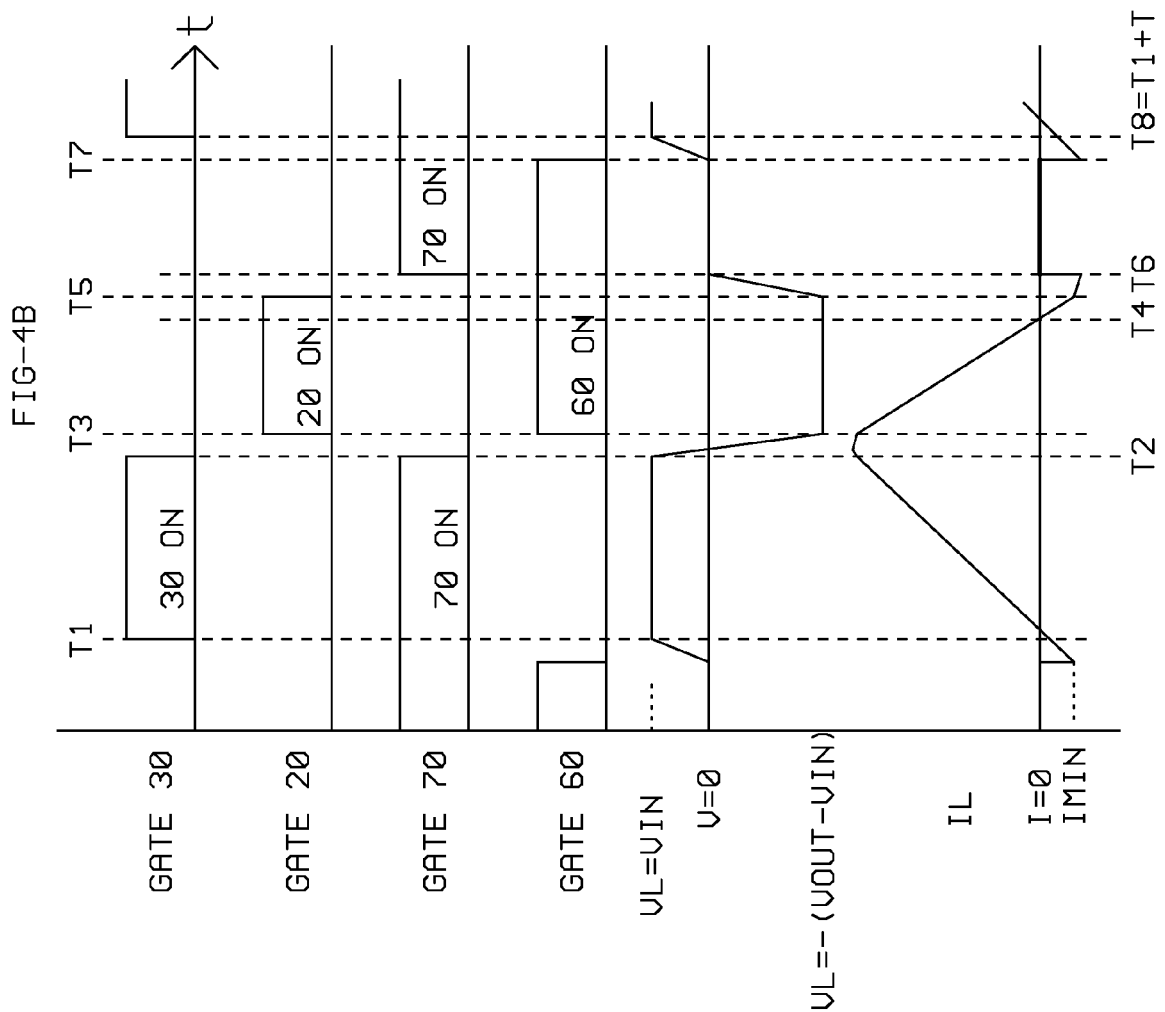

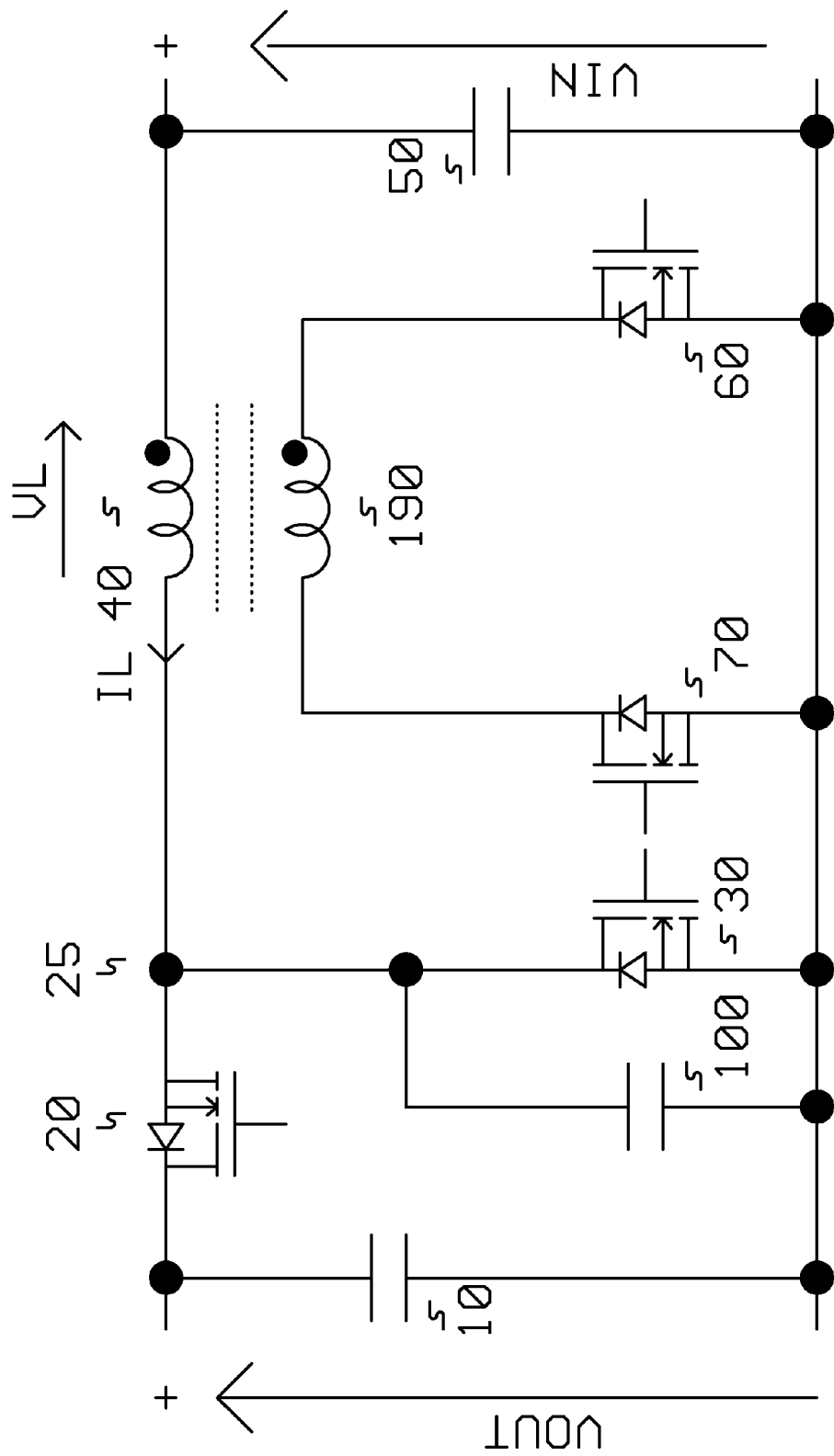

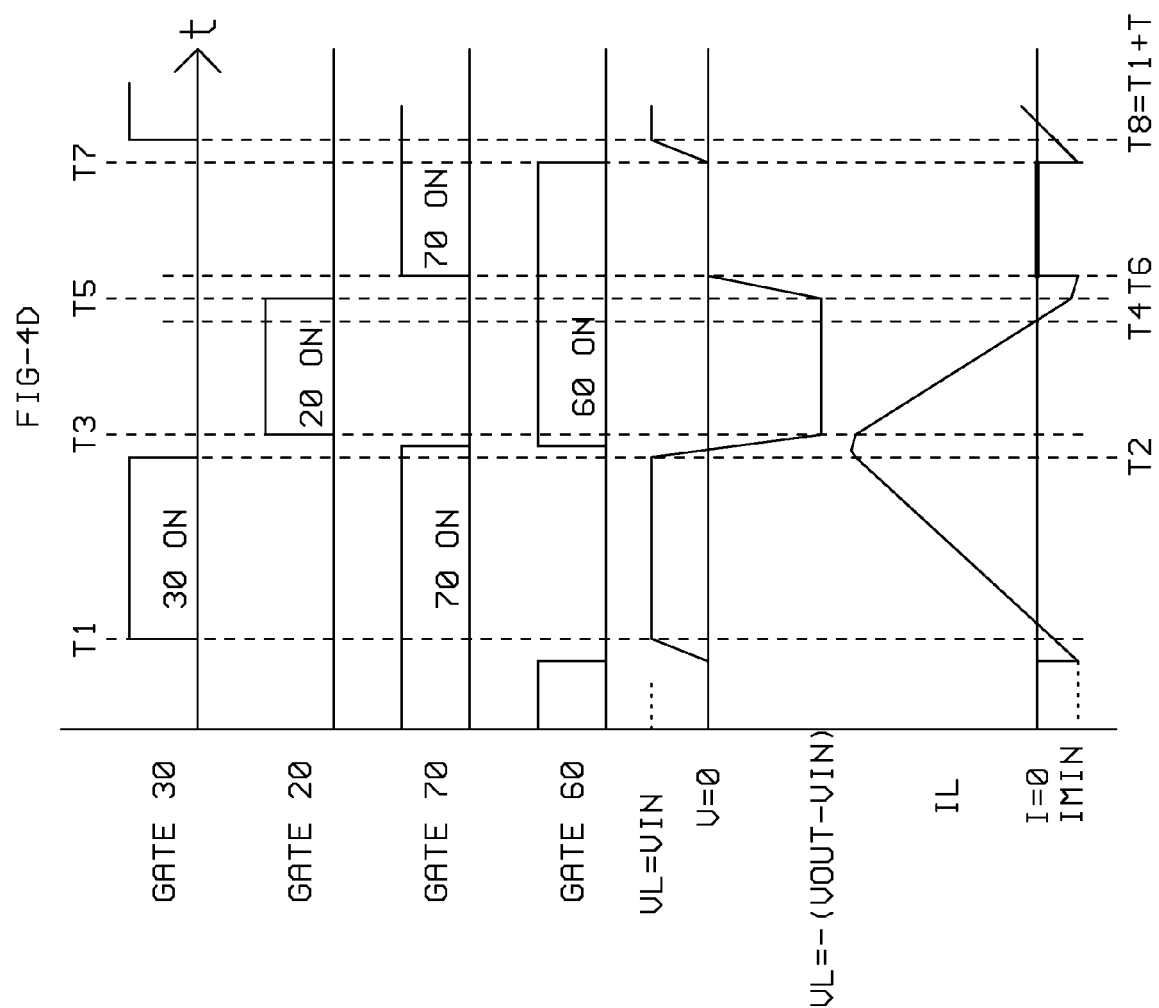

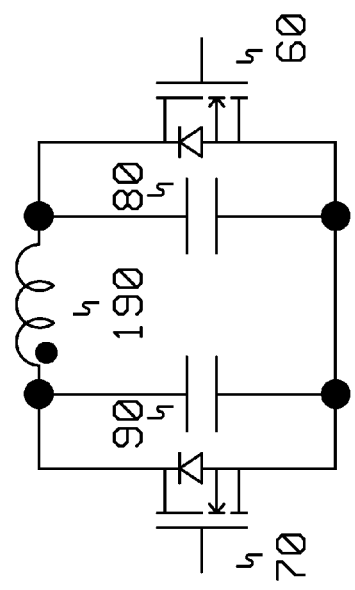
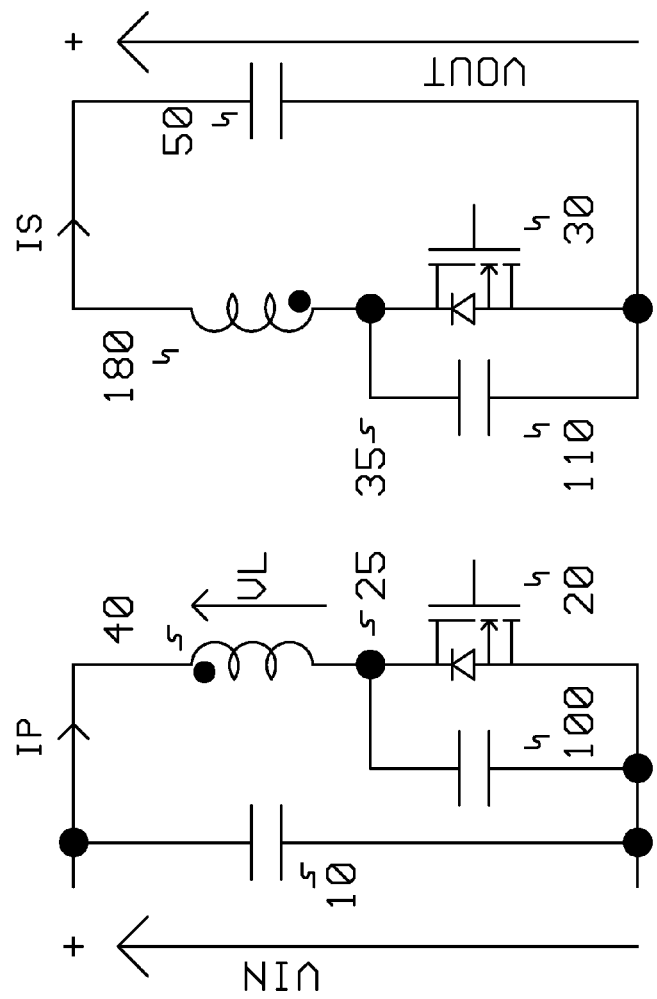
FIG-5A

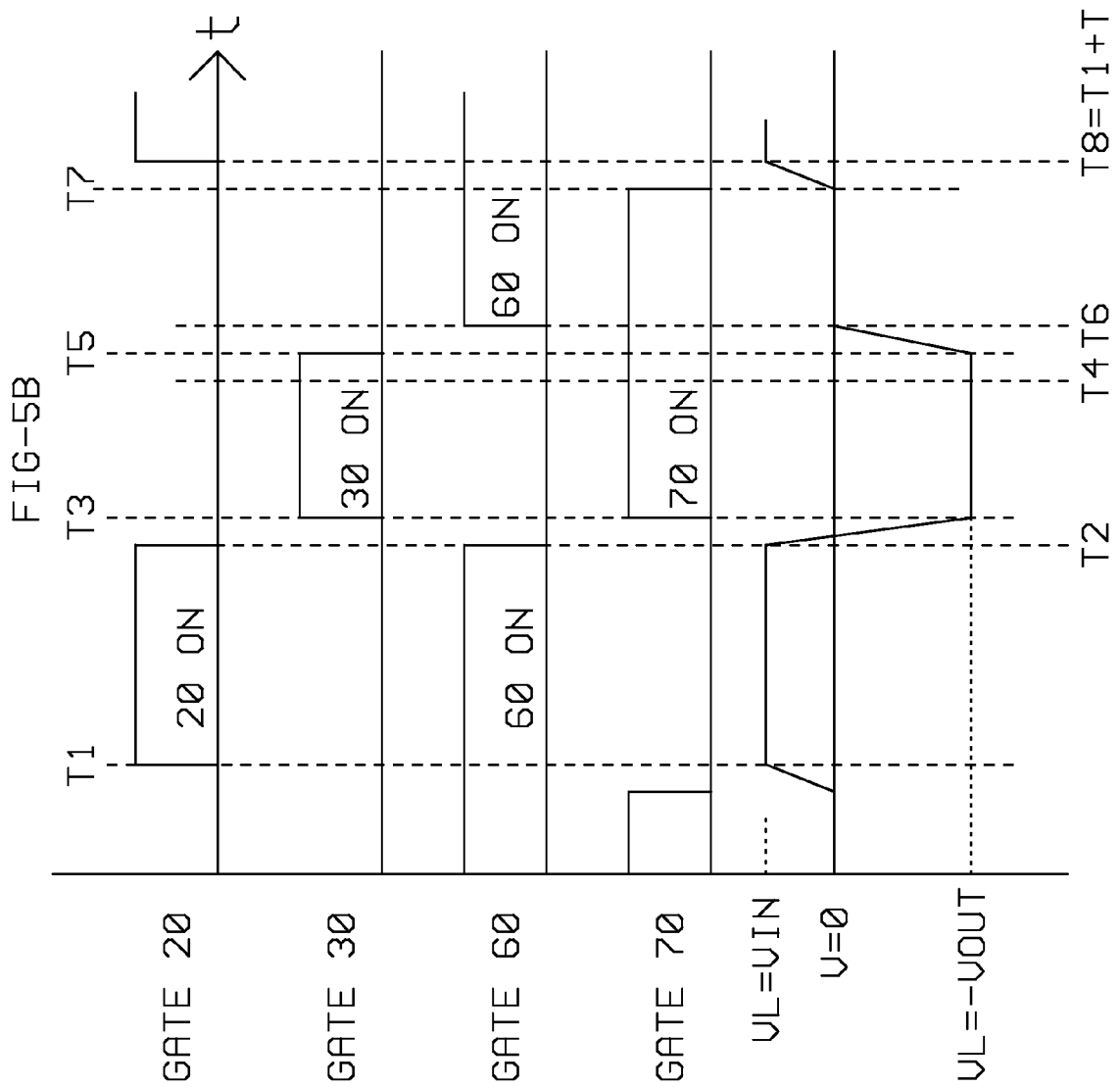

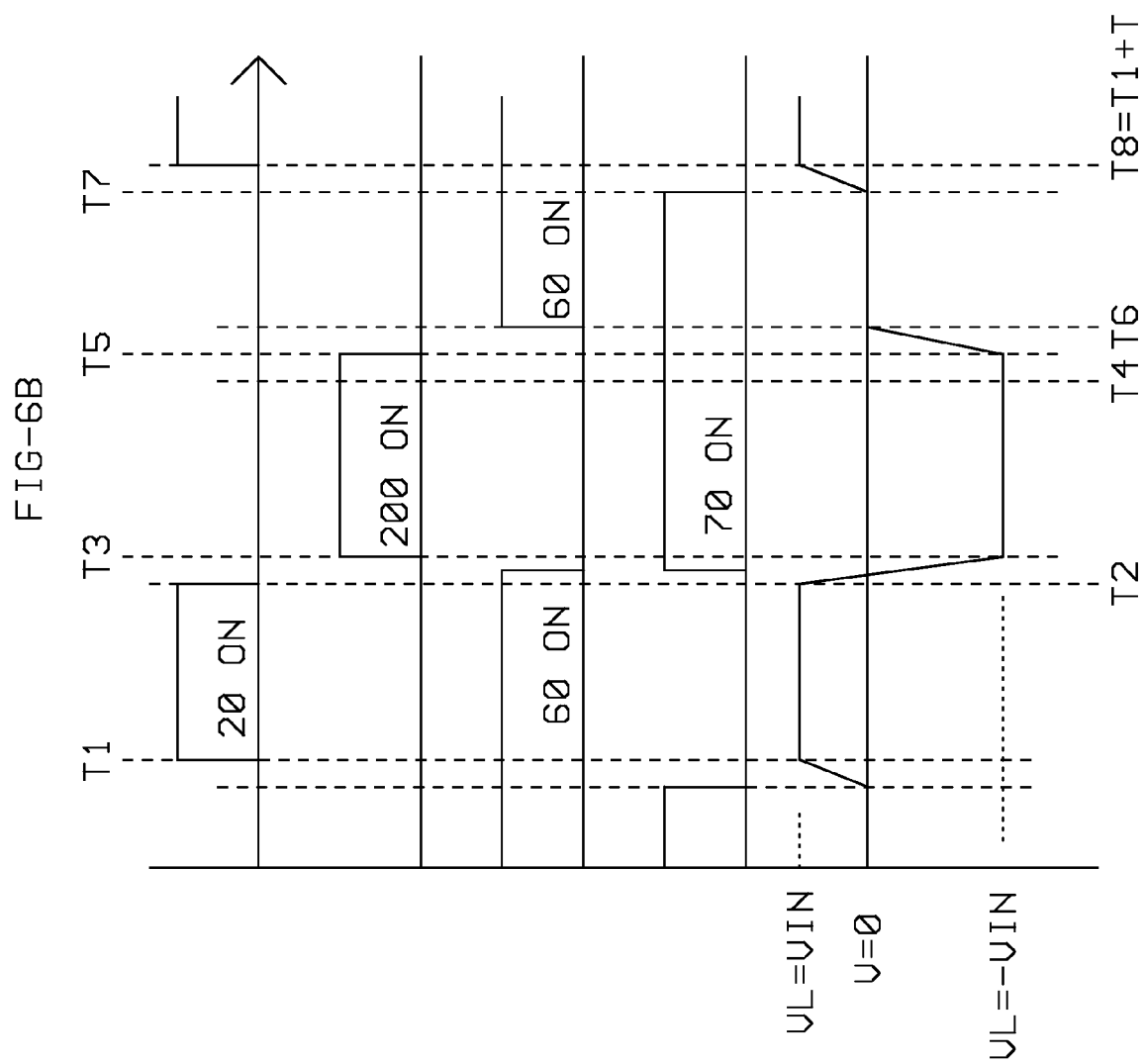

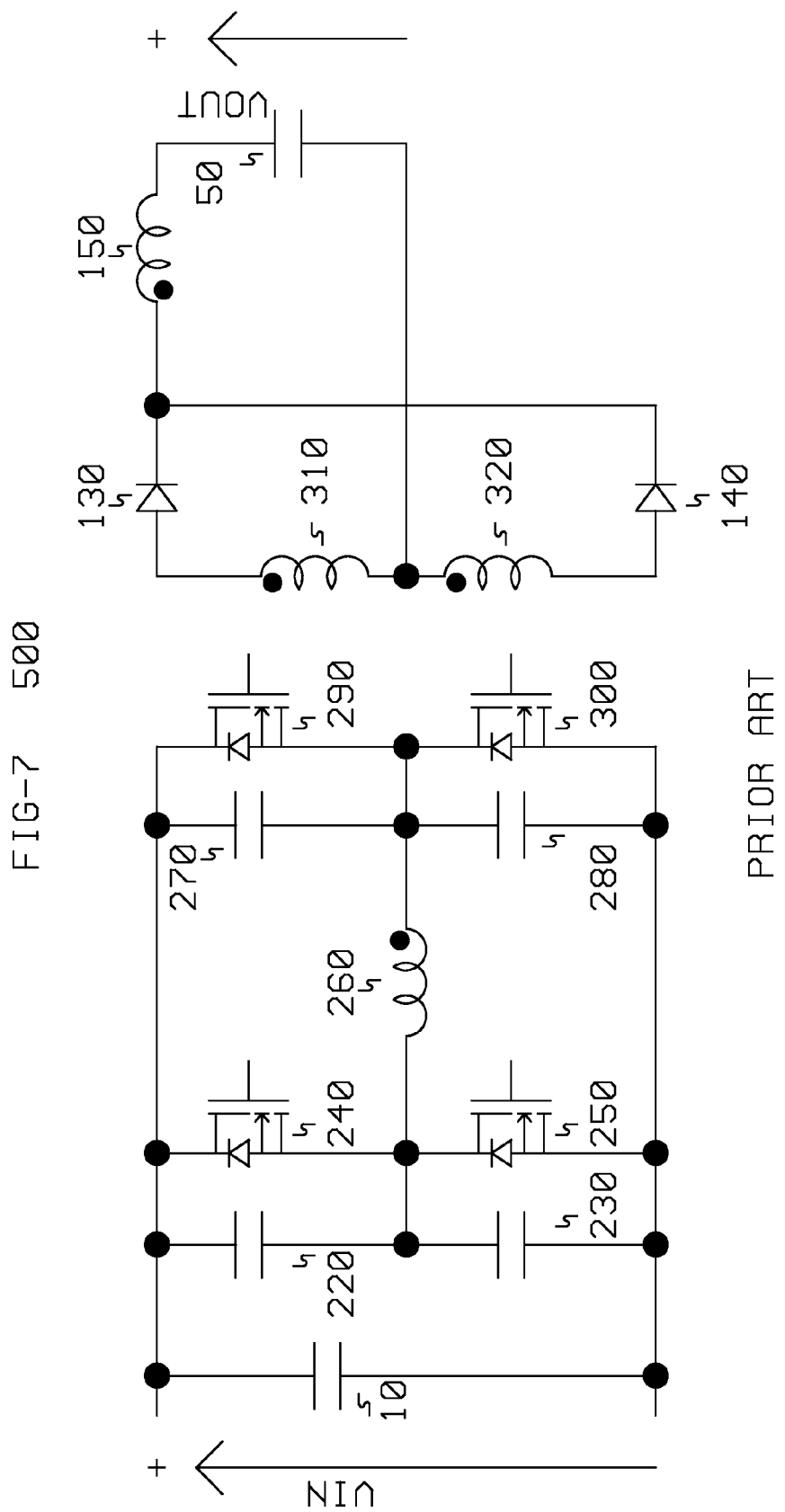
FIG-7 500 PRIOR ART

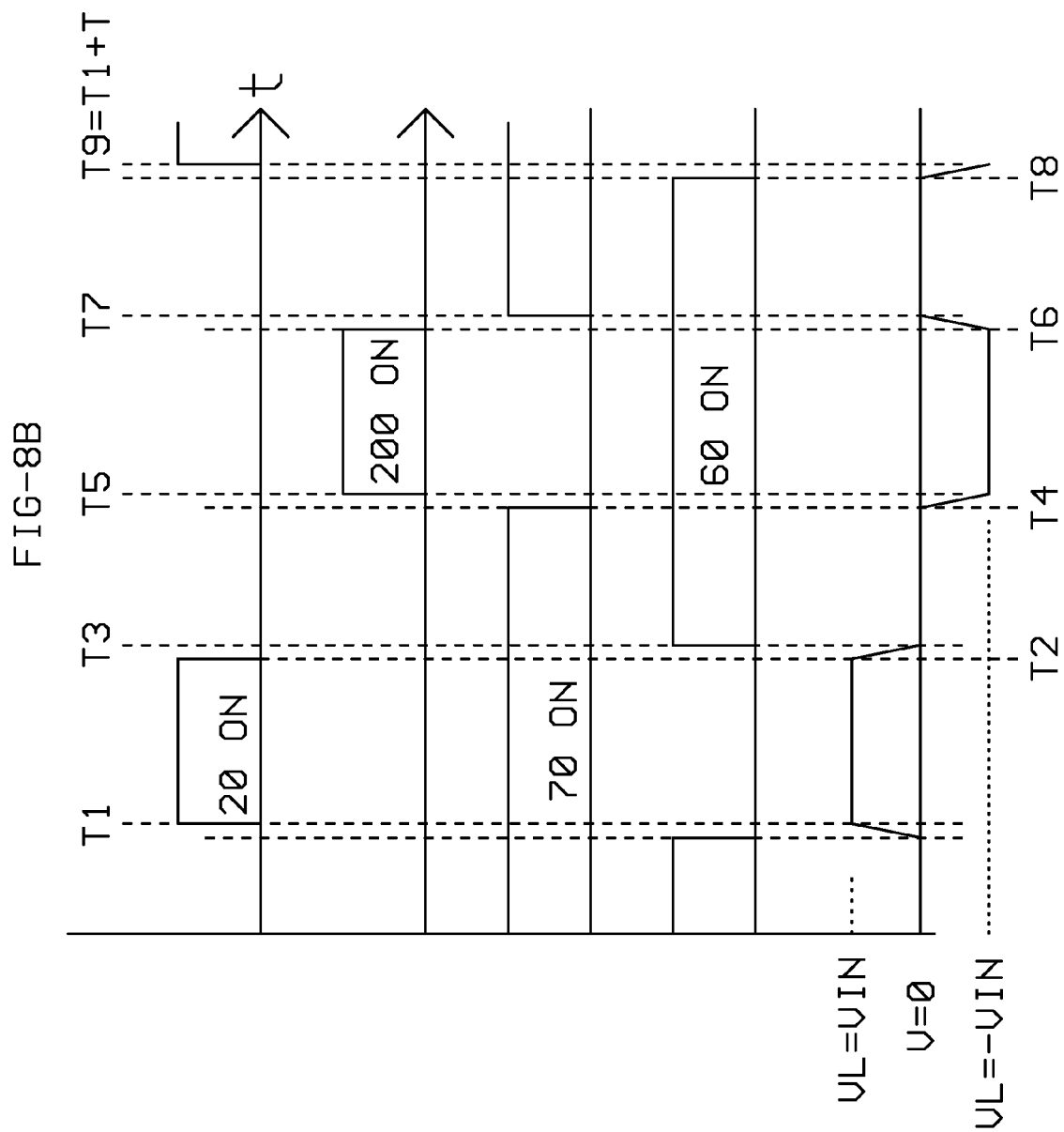

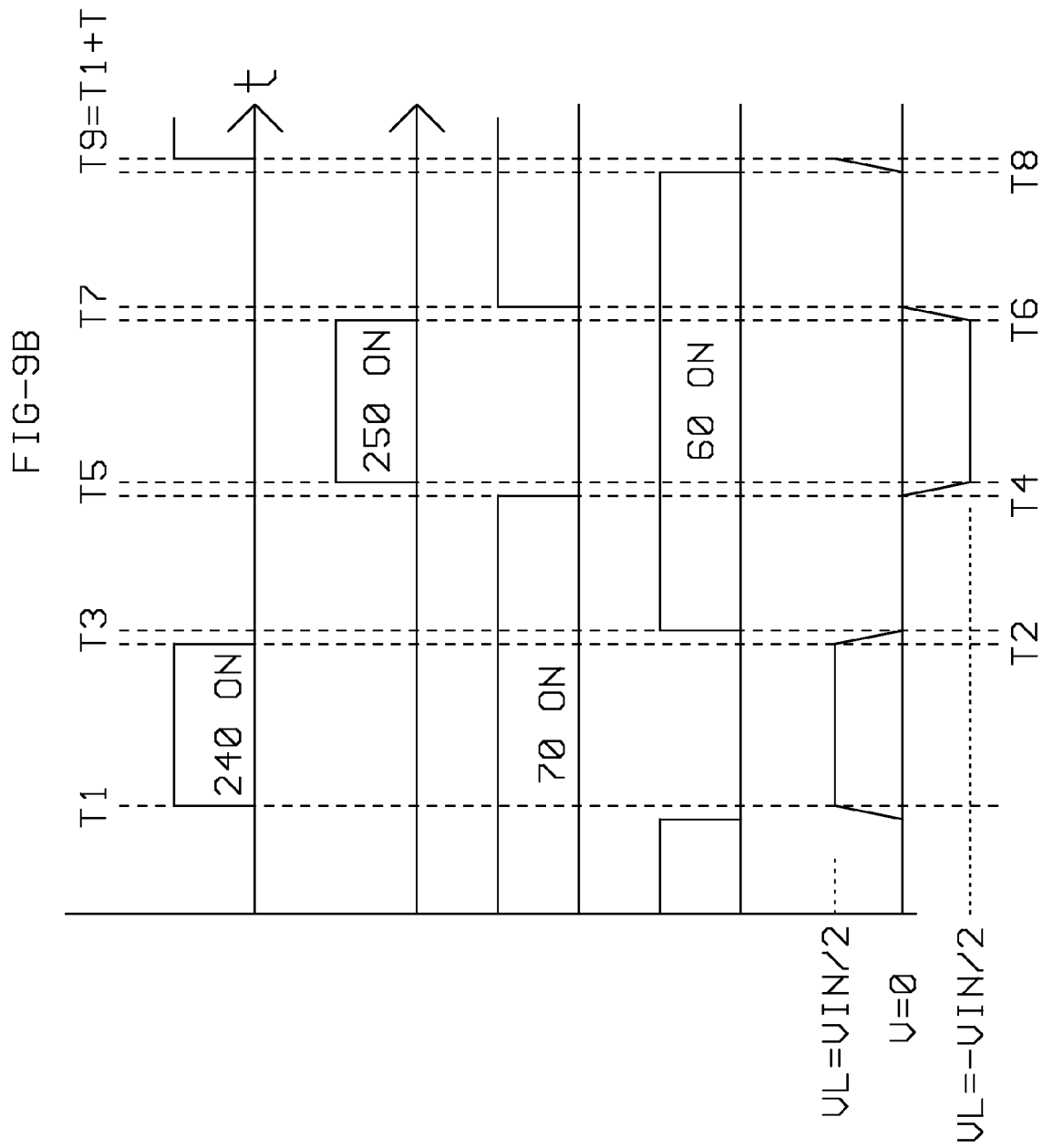

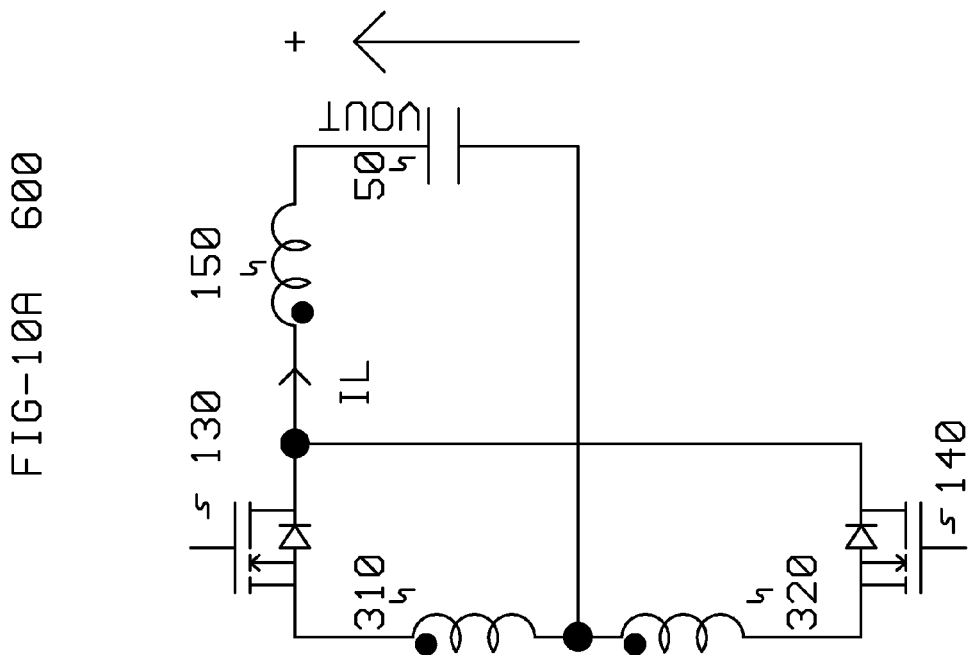
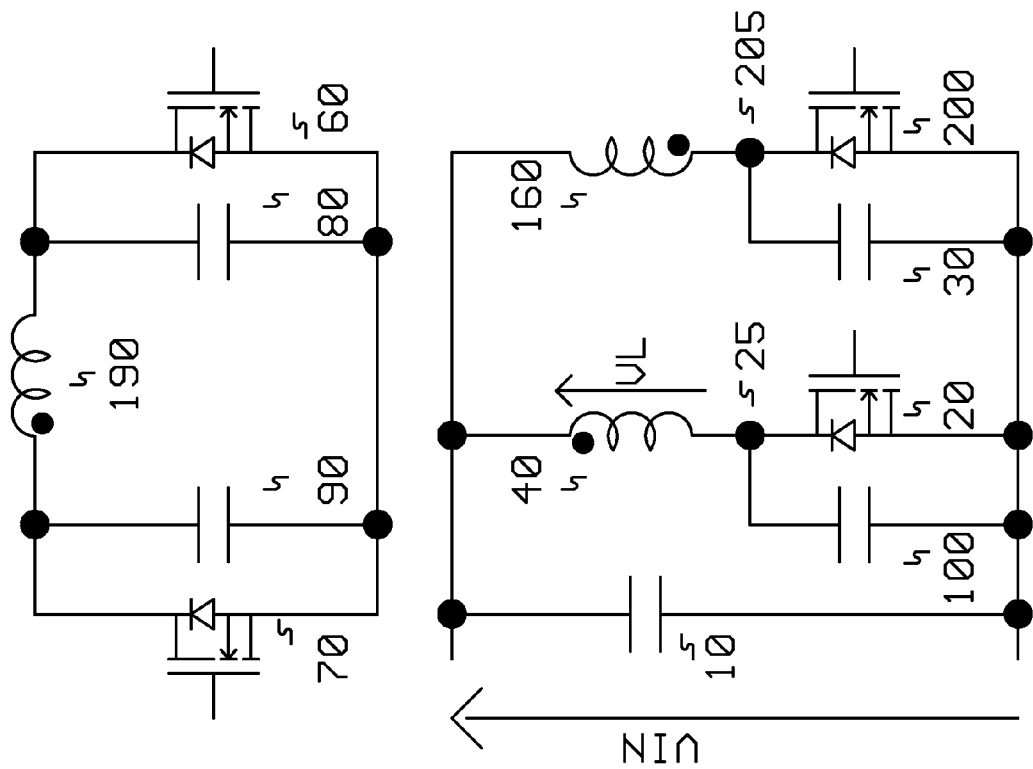
FIG-10A 600

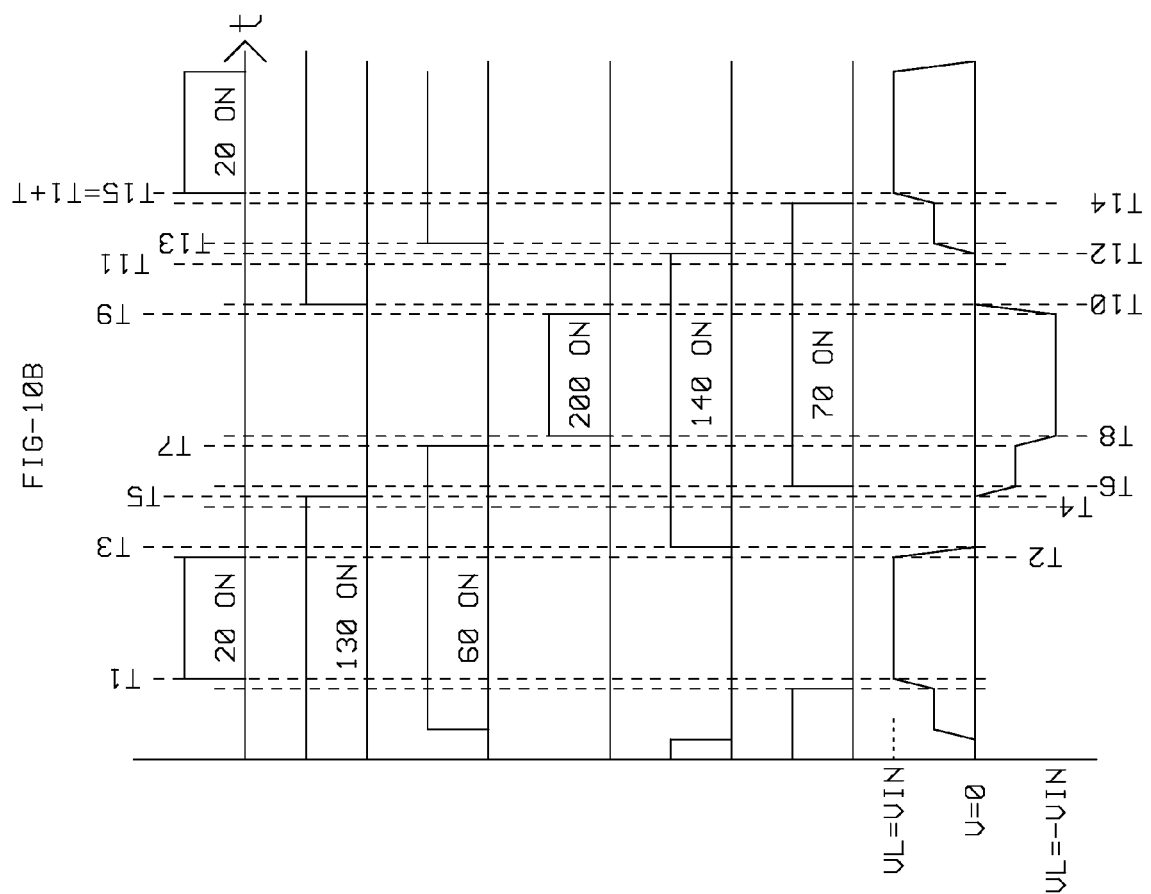

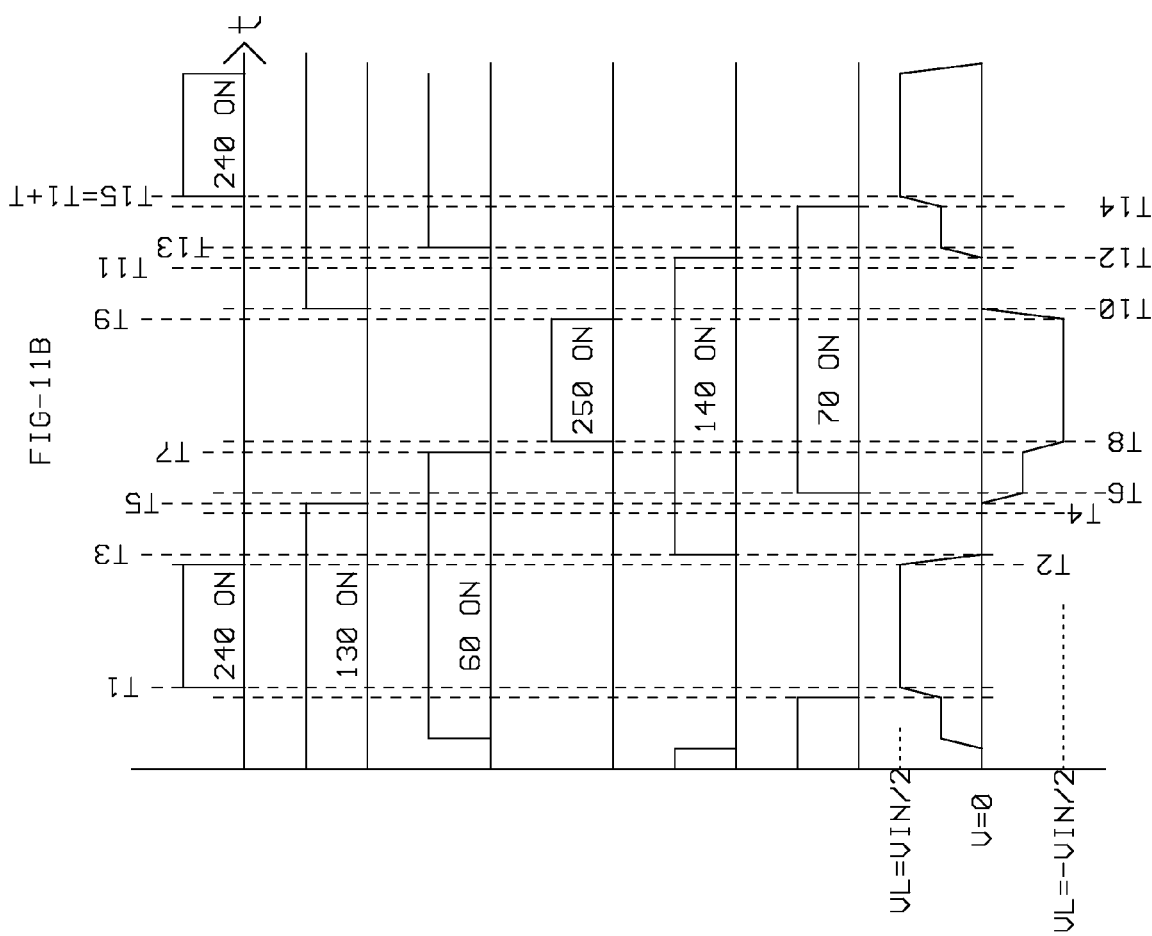

POWER CONVERSION WITH ZERO VOLTAGE SWITCHING

TECHNICAL FIELD

The present application relates to the field of power converters, and more particularly to a power converter arranged with a switchable circuit across an electric coil of the power converter.

BACKGROUND OF THE INVENTION

A power conversion system receives an input direct current (DC) or alternating current (AC) power, and converts it to a DC or AC output power, typically exhibiting a different voltage than the input power. Control of the output power may be responsive to the output voltage or to the output current.

A boost converter, also known as a step-up converter, is a power converter with an output voltage greater than its input voltage. It is a class of switching-mode power supply containing at least a first electronically controlled switch, e.g. a transistor, at least a first energy storage element, e.g. an electric coil, and an additional element such as a diode or a second electronically controlled switch. Typically, the electronically controlled switches and diode are arranged between the electric coil and the output, with current being alternately drawn to charge the electric coil responsive to the first electronically controlled switch being closed, and passed to a load responsive to the first electronically controlled switch being open. The current goes through the diode or the second electronically controlled switch when it is passed to the load.

A buck converter, also known as a step-down converter, is a power converter with an output voltage less than its input voltage. It is a class of switching-mode power supply containing at least a third electronically controlled switch, e.g. a transistor, at least a second energy storage element, e.g. an electric coil, and an additional element such as a diode or a fourth electronically controlled switch. Typically, the electronically controlled switches and diode are arranged between the input power source and the electric coil, with current being alternately drawn to charge the electric coil through a load responsive to the third electronically controlled switch being closed, and continued to the load discharging the electric coil responsive to the third electronically controlled switch being open. The diode or the fourth electronically controlled switch is in series with the electric coil when the electric coil is discharging to the load.

A flyback converter is a converter with an output voltage which can be greater than or less than the input voltage. It is a class of switching mode power supply containing: at least one electronically controlled switch; an energy storage element comprising at least one electric coil, specifically a transformer, thereby the voltage ratios are multiplied with an additional advantage of isolation; and at least one additional element, such as a diode and/or additional electronically controlled switches. Typically, the primary electric coil of the transformer is connected between the electronically controlled switch and the input voltage and the secondary electric coil of the transformer is connected between the additional element and the output.

The above listing of power converters is meant to be illustrative of a number of topologies, however this is not meant to be limiting in any way.

Growing demand for high density equipments continuously requires power supplies with higher switching frequencies. The higher the switching frequency, the smaller the power supply for a predetermined rating, and the faster the dynamic response of the power supply. Losses in the various switching topologies are at least partially due to switching losses, i.e. when one of the electronically controlled switches changes state from the off state, i.e. open, to the on state, i.e. closed, and from the on state to the off state. The finite duration of the switching transient of the electronically controlled switch, as well as the non-zero voltage thereacross and the current flowing therethrough, results in switching losses in the switch. As the switching frequency increases, the relevant portion of losses associated with the switching increases.

Zero voltage switching (ZVS), is defined as changing the state of the switch from the off state to the on state when the voltage across the switch is at or near zero. ZVS significantly reduces the amount of switching losses during the closing of the switch.

U.S. Pat. No. 4,672,303 issued Jun. 9, 1987 to Newton, the entire contents of which is incorporated herein by reference, is addressed to a DC/DC converter having reduced switching losses at high frequencies, by providing for zero voltage switching of the buck converter in-line switch. Unfortunately, the arrangement requires that the operating frequency of the DC/DC converter increase with reduced load, otherwise the peak to peak current in the electric coil will be independent of the load, and a large current may be circulated between the input and output even with a small load. U.S. Pat. No. 7,154,250 issued Dec. 26, 2006 to Vinciarelli, the entire contents of which is incorporated herein by reference, is addressed to a Buck-Boost DC-DC Switching Power Conversion apparatus having a clamp phase. Unfortunately, the method of Vinciarelli is not applicable to a broad range of converters since it requires the clamp phase to be supplied by a particular arrangement and timing of the switching devices used to charge and discharge the electric coil.

What is desired, and not provided by the prior art, is a method of achieving zero voltage switching which allows for a fixed operating frequency over a wide range of load and input voltage conditions.

SUMMARY

Accordingly, it is a principal object of the present embodiments to overcome at least some of the disadvantages of the prior art. This is provided in certain embodiments by an arrangement in which current flow in an electric coil storage element, in certain embodiment being a winding of a transformer, is maintained by a short circuit condition associated with the electric coil storage element, such that the change of current over time for the electric coil is set to near zero, the short circuit condition being achieved without reference to the switches used to perform the energy transfer functionality of the power converter. This condition is maintained to achieve a zero voltage switching condition. Preferably, the zero voltage switching condition is thus achieved at a fixed converter switching frequency, regardless of the input voltage and output load. In an exemplary embodiment, an additional electric coil is provided, in one embodiment the additional electric coil being an additional winding of the transformer, magnetically coupled with the first electric coil, and the short circuit condition is created across the additional electric coil.

In one particular embodiment, the zero voltage switching condition is achieved by adjusting the current flowing through the storage element to be great enough to discharge the capacitance associated with the switch to be switched on. In one preferred embodiment the arrangement is non-dissipative, i.e. the discharged energy from the associated capacitance is recycled into the circuit. In one preferred embodiment the amount of current formed in order to achieve the zero voltage switching condition is controlled so as not to exceed the minimum current actually needed to achieve ZVS. In one preferred embodiment the arrangement provides for a zero voltage switching condition without introducing any additional constraints on bandwidth. Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1B shows a graph of the operation of the buck converter of FIG. 1A, as a synchronous buck converter in accordance with the prior art;

FIG. 2B shows a graph of the operation of the synchronous buck converter of FIG. 2A according to certain embodiments;

FIG. 3B shows a graph of the operation of the synchronous buck converter of FIG. 3A according to certain embodiments;

FIG. 3D shows a graph of the operation of the synchronous buck converter of FIG. 3C according to certain embodiments;

FIG. 4B shows a graph of the operation of the synchronous boost converter of FIG. 4A according to certain embodiments;

FIG. 4C illustrates a high level schematic diagram of a synchronous boost converter with a pair of magnetically coupled electric coils, and without capacitors in the short circuitry loop, according to certain embodiments;

FIG. 4D shows a graph of the operation of the synchronous boost converter of FIG. 4C according to certain embodiments;

FIG. 5A illustrates a high level schematic diagram of a synchronous flyback converter, with a plurality of magnetically coupled electric coils, according to certain embodiments;

FIG. 5B shows a graph of the operation of the synchronous flyback converter of FIG. 5A according to certain embodiments;

FIG. 6B shows a graph of the operation of the single ended forward converter of FIG. 6A according to certain embodiments;

FIG. 7 illustrates a high level schematic diagram of a full bridge phase shift converter, according to the prior art;

FIG. 8B shows a graph of the operation of the push-pull converter of FIG. 8A according to certain embodiments;

FIG. 9B shows a graph of the operation of the half bridge converter of FIG. 9A according to certain embodiments;

FIG. 10A illustrates a high level schematic diagram of a push-pull converter, with a plurality of magnetically coupled electric coils, and with synchronous rectifiers at the output;

FIG. 10B shows a graph of the operation of the push-pull converter of FIG. 10A according to certain embodiments;

FIG. 11B shows a graph of the operation of the half bridge converter of FIG. 11A, according to certain embodiments.

DETAILED DESCRIPTION OF PREFERRED EMBODIMENTS

Figure 1A:
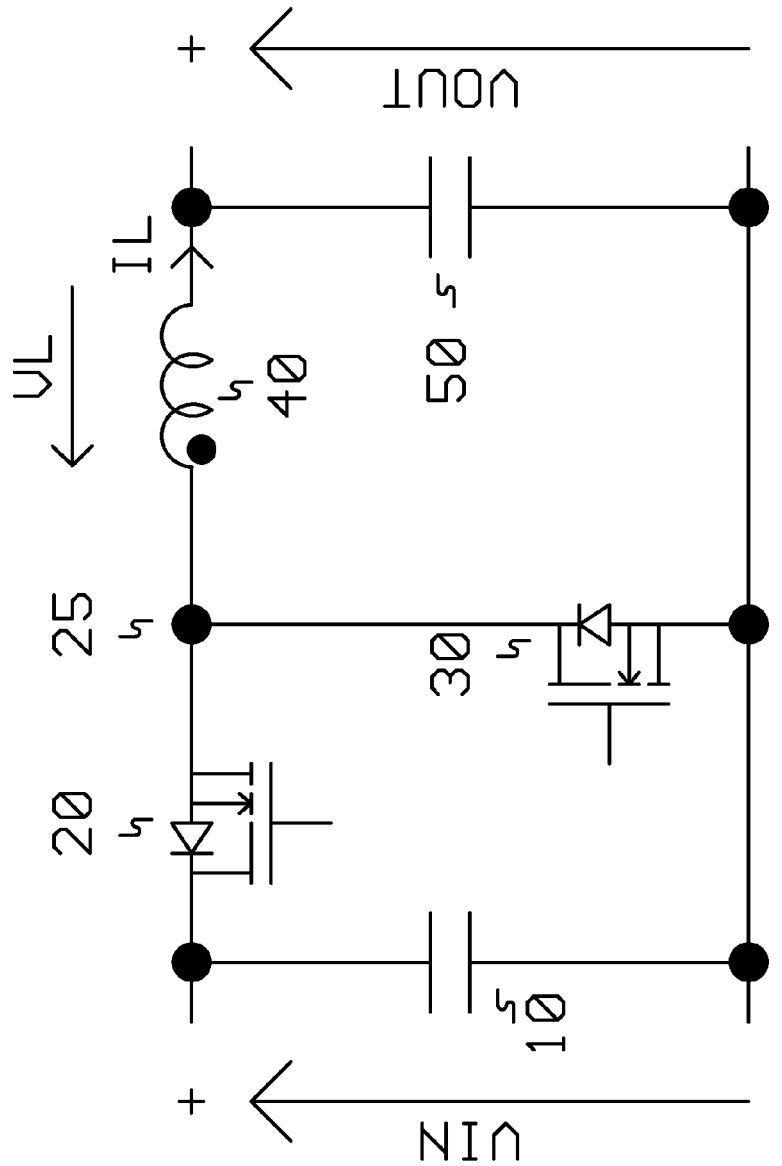
FIG. 1A illustrates a high level schematic diagram of a synchronous buck converter, known to the prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is herein described in relation to a plurality of converters, particularly a buck converter, a boost converter, a flyback converter, a single ended forward converter, a push-pull converter, and a half-bridge converter, however this is not meant to be limiting in any way and the teaching of the invention is equally applicable to any power converter configuration.

FIG. 1A illustrates a high level schematic diagram of a synchronous buck converter, known to the prior art, comprising: an input capacitor 10; a first electronically controlled switch 20; a second electronically controlled switch 30; an electric coil 40; and an output capacitor 50. First and second electronically controlled switches 20 and 30 are illustrated as n-channel metal-oxide-semiconductor field-effect transistors (NMOSFETs), however this is not meant to be limiting in any way. Input capacitor 10 is connected across an input voltage, denoted VIN. A first end of input capacitor 10, associated with the positive side of VIN, is connected to the drain of first electronically controlled switch 20. The second end of input capacitor 10 is connected to the source of second electronically controlled switch 30, and to a first end of output capacitor 50. The source of first electronically controlled switch 20 is connected to the drain of second electronically controlled switch 30 and to a first end of electric coil 40, the junction being denoted junction 25. The second end of electric coil 40 is connected to the second end of output capacitor 50. An output voltage, denoted VOUT is developed across output capacitor 50, with the positive polarity associated with the second end of electric coil 40. The gates of first and second electronically controlled switches 20 and 30 are connected to a control circuitry (not shown) known to the prior art. The voltage across electric coil 40, measured from junction 25 in relation to VOUT is denoted VL and the current flowing therethrough from junction 25 is denoted IL.

Figure 1C:
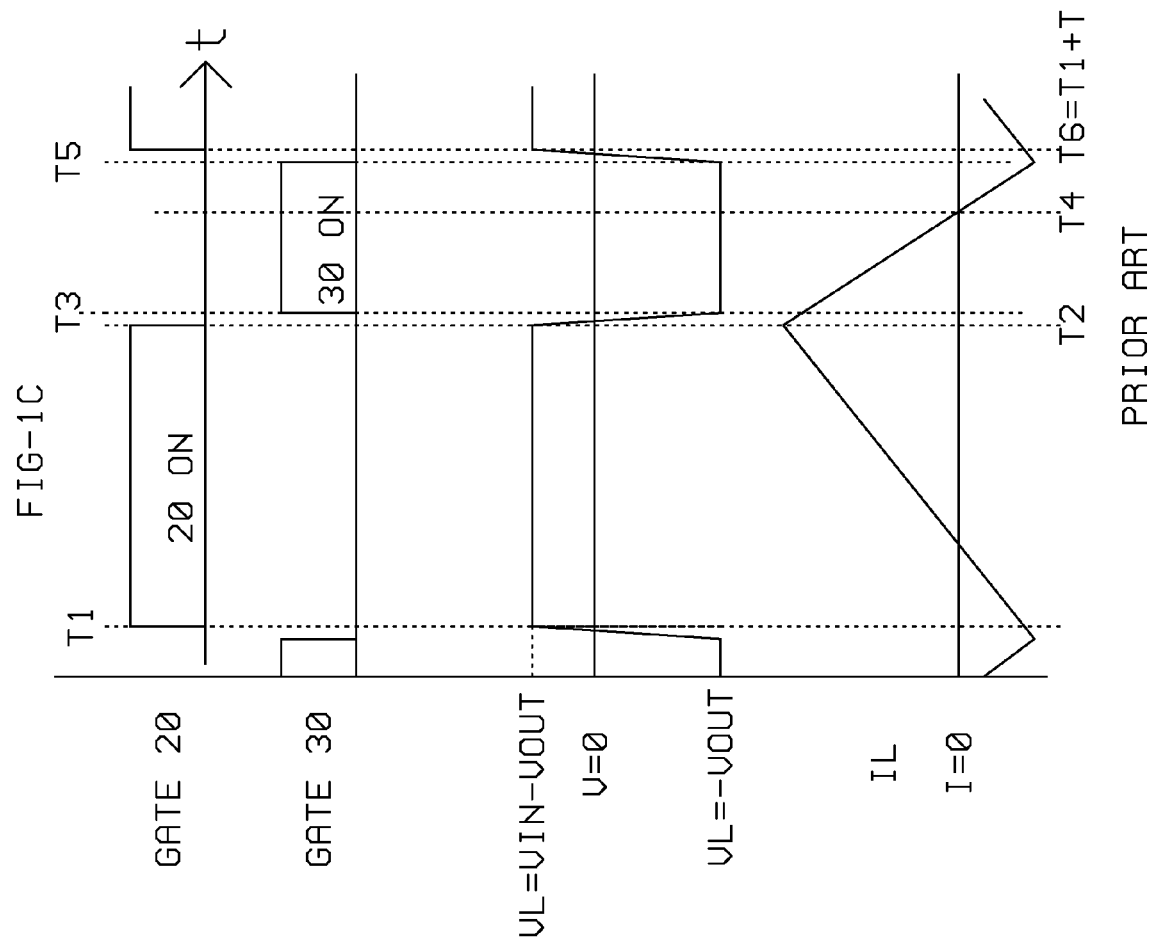
FIG. 1C shows a graph of the operation of the buck converter of FIG. 1A, wherein the electric coil current becomes negative every cycle, in accordance with the prior art.

FIG. 1B shows a graph of the operation of the buck converter of FIG. 1A, in cooperation with a control circuitry arranged to drive first and second electronically controlled switches 20, 30 as a synchronous buck converter in accordance with the prior art, with the x-axis representing time and the y-axis representing voltage and current, respectively, in arbitrary units. FIG. 1C shows a graph of the operation of the buck converter of FIG. 1A, in cooperation with a control circuitry arranged to drive first and second electronically controlled switches 20, 30 as a synchronous buck converter in accordance with the prior art, with the x-axis representing time and the y-axis representing voltage and current, respectively, in arbitrary units. The graphs of FIGS. 1B and 1C illustrate: the gate-source voltages of first and second electronically controlled switches 20 and 30; voltage VL across electric coil 40; and current IL of electric coil 40. For the sake of simplicity, each of FIGS. 1B and 1C will be described together with FIG. 1A.

In operation as illustrated in FIG. 1B, at time T1 voltage VL across electric coil 40 is equal to −VOUT, the potential at junction 25 thus being zero. First electronically controlled switch 20 is switched on, the switching on thereof not being at zero voltage switching (ZVS) since the voltage at junction 25 is at zero. Following time T1, as VIN is connected to junction 25 by first electronically controlled switch 20, electric coil 40 current IL increases according to the equation:

$$\frac{dIL}{dt} = \frac{VL}{L},$$

where L is the inductance of electric coil 40. At time T2 first electronically controlled switch 20 is switched off. The voltage at junction 25 begins to drop, responsive to the discharging of the capacitance of junction 25, until time T3 when second electronically controlled switch 30 is closed, which is typically at ZVS. Electric coil 40 current IL begins to decline when the voltage at junction 25 drops below VOUT, i.e. when electric coil 40 voltage VL becomes negative, and continues to decline until at time T4 second electronically controlled switch 30 is switched off. The voltage at junction 25 is maintained at zero since electric coil current IL flows through the body diode of electronically controlled switch 30. At time T5 first electronically controlled switch 20 is switched on, the switching on thereof not being ZVS since the voltage across first electronically controlled switch 20 is VIN, as described above in relation to T1.

In the synchronous buck converter embodiment as illustrated in FIG. 1C, at time T1 voltage VL across electric coil 40 is equal to VIN−VOUT, the potential at junction 25 thus being VIN. First electronically controlled switch 20 is switched on, the switching on thereof being at ZVS since the voltage at junction 25 is at VIN. Following time T1, as VIN is connected to junction 25 by first electronically controlled switch 20, electric coil 40 current IL increases according to the equation:

$$\frac{dIL}{dt} = \frac{VL}{L},$$

where L is the inductance of electric coil 40. At time T2 first electronically controlled switch 20 is switched off. The voltage at junction 25 begins to drop, responsive to the discharging of the capacitance of junction 25, until time T3 when second electronically controlled switch 30 is closed, which is typically at ZVS. Electric coil 40 current IL begins to decline when the voltage at junction 25 drops below VOUT, i.e. electric coil 40 voltage VL becomes negative, and continues to decline until at time T4, when current has fallen to zero. Electric coil 40 current IL reverses after time T4, until at time T5 second electronically controlled switch 30 is switched off. Since electric coil 40 current IL is negative it does not flow through the body diode of second electronically controlled switch 30 and the voltage at junction 25 begins to rise, responsive to the charging of the capacitance of junction 25, until time T6 when first electronically controlled switch 20 is switched on, which is typically at ZVS. In one particular embodiment, the minimum current point reached by electric coil 40 current IL, denoted IMIN, is selected such that the voltage at junction 25 rises to VIN, thus ensuring zero voltage switching at point T1. Disadvantageously, time T5 can not be controlled, since it is a function of the value of L and IMIN. Thus, as the output current varies, ZVS is not maintained unless the cycle time T is changed accordingly.

Figure 2A:
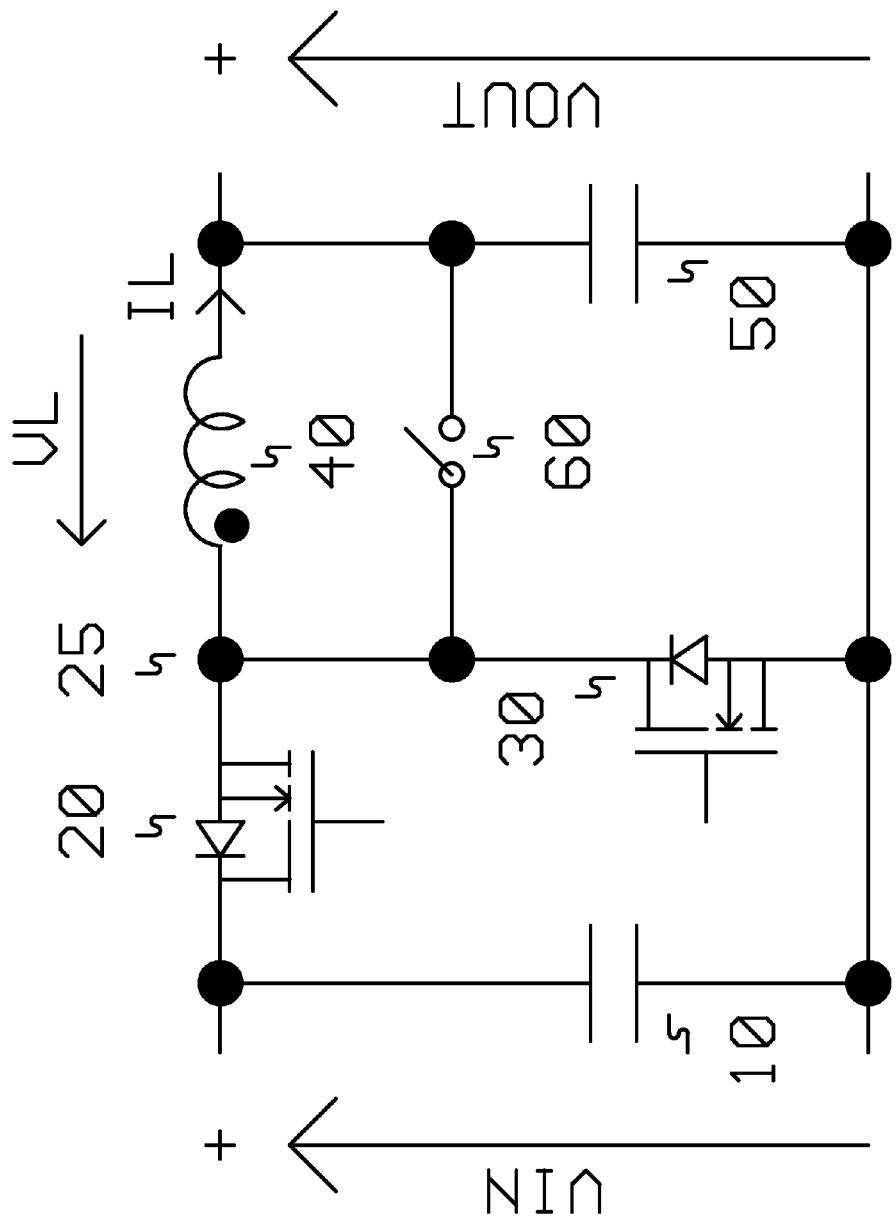
FIG. 2A illustrates a high level schematic diagram of a synchronous buck converter according to certain embodiments, comprising a bi-directional switch associated with the electric coil to create a short circuit condition.

FIG. 2A illustrates a high level schematic diagram of a synchronous buck converter 55, according to certain embodiments, comprising: an input capacitor 10; a first electronically controlled switch 20; a second electronically controlled switch 30; an electric coil 40; an output capacitor 50; and a third electronically controlled switch 60. First and second electronically controlled switches 20 and 30 are in one embodiment constituted of NMOSFETs. Third electronically controlled switch 60 is a bi-directional electronically controlled switch. A first end of input capacitor 10 is connected to the drain of first electronically controlled switch 20 and to the positive polarity of an input voltage VIN. The second end of input capacitor 10 is connected to the source of second electronically controlled switch 30 and to a first end of output capacitor 50. The source of first electronically controlled switch 20 is connected to the drain of second electronically controlled switch 30, a first end of electric coil 40, and a first end of third electronically controlled switch 60, the junction being denoted 25. The second end of storage element electric coil 40 is connected to the second end of output capacitor 50 and the second end of third electronically controlled switch 60. The gates of first and second electronically controlled switches 20 and 30, and the control input of third electronically controlled switch 60, are connected to a control circuitry (not shown) as will be described below in relation to FIG. 12. The voltage across output capacitor 50 is denoted VOUT, with the positive polarity thereof associated with the second end of electric coil 40. The voltage across electric coil 40, measured from junction 25 in relation to output VOUT is denoted VL, and the current flowing therethrough away from junction 25 is denoted IL.

FIG. 2B shows a graph of the operation of synchronous buck converter 55 of FIG. 2A, with the x-axis representing time and the y-axis representing voltage and current, in arbitrary units. The graph of FIG. 2B illustrates: the gate-source voltages of first and second electronically controlled switches 20 and 30; the gate or control signal of third electronically controlled switch 60; voltage VL; and current IL. For the sake of simplicity FIGS. 2A and 2B will be described together.

In operation, at time T1 electric coil 40 voltage VL is equal to VIN−VOUT, i.e. the potential at junction 25 is VIN. First electronically controlled switch 20 is switched on, the switching on thereof being at ZVS since the voltage at junction 25 is equal to voltage VIN. Responsive to the positive voltage across electric coil 40, electric coil 40 current IL increases, as described above in relation to FIGS. 1A-1C. At time T2 first electronically controlled switch 20 is switched off. After time T2 the voltage at junction 25 begins to drop, responsive to the discharging of the capacitance of junction 25, thus the rate of change of electric coil 40 current IL begins to fall, electric coil 40 current IL beginning to decline when the voltage at junction 25 drops below VOUT, i.e. electric coil 40 voltage VL becomes negative. In one preferred embodiment the on time of first electronically controlled switch 20 is selected such that the maximum value reached by electric coil 40 current IL is the minimal current necessary at the output. At time T3, electric coil 40 voltage VL has fallen to −VOUT, and thus the voltage across second electronically controlled switch 30 is zero, and second electronically controlled switch 30 is turned on by the control circuitry, at ZVS.

Electric coil 40 current IL after time T3 flows through second electronically controlled switch 30 at a linearly decreasing amplitude. At time T4, the amplitude of electric coil 40 current IL is zero, and then the amplitude of electric coil 40 current IL continues to decline, becoming negative, with energy being sourced by output capacitor 50. Electric coil 40 current IL continues to decline and at time T5, responsive to the current reaching IMIN, second electronically controlled switch 30 is switched off. The voltage at junction 25 rises as the capacitance of junction 25 is charged, thus the rate of change of electric coil 40 current IL begins to fall. At time T6 the voltage at junction 25 has risen to the value VOUT, i.e. there is no voltage drop across electric coil 40. The control circuit, to be described further below, closes third electronically controlled switch 60, thus creating an effective short circuit across electric coil 40. Since with a short circuit the voltage across storage element electric coil 40 remains zero, the change in current dI/dt is also zero, and the current amplitude and direction from time T6 is maintained. At time T7, switch 60 is opened, and electric coil 40 voltage VL again climbs to the value VIN−VOUT and electric coil 40 current IL begins to rise. At time T8, which is the end of the cycle, equivalent to time T1 described above, the voltage across first electronically controlled switch is again zero, i.e the voltage at junction 25 has reached VIN, and first electronically controlled switch 20 is again closed under ZVS.

In one preferred embodiment the on time of second electronically controlled switch 30 is selected such that the value of electric coil 40 current IL at time T6, denoted IMIN, is the minimal value required so as to insure that the potential at junction 25 reaches VIN at time T8 under the maximum value for VIN and under maximum design load conditions. In one further preferred embodiment the on time of second electronically controlled switch 30 is selected such that IMIN is a function of VIN. The operation of third electronically controlled switch 60, which is not involved in charging, or discharging, electric coil 40, allows for stretching the cycle to T. As described above, the voltage across third electronically controlled switch 60 is voltage VL, thereby third electronically controlled switch 60 must be able to operate under both positive and negative voltages.

Figure 3A:
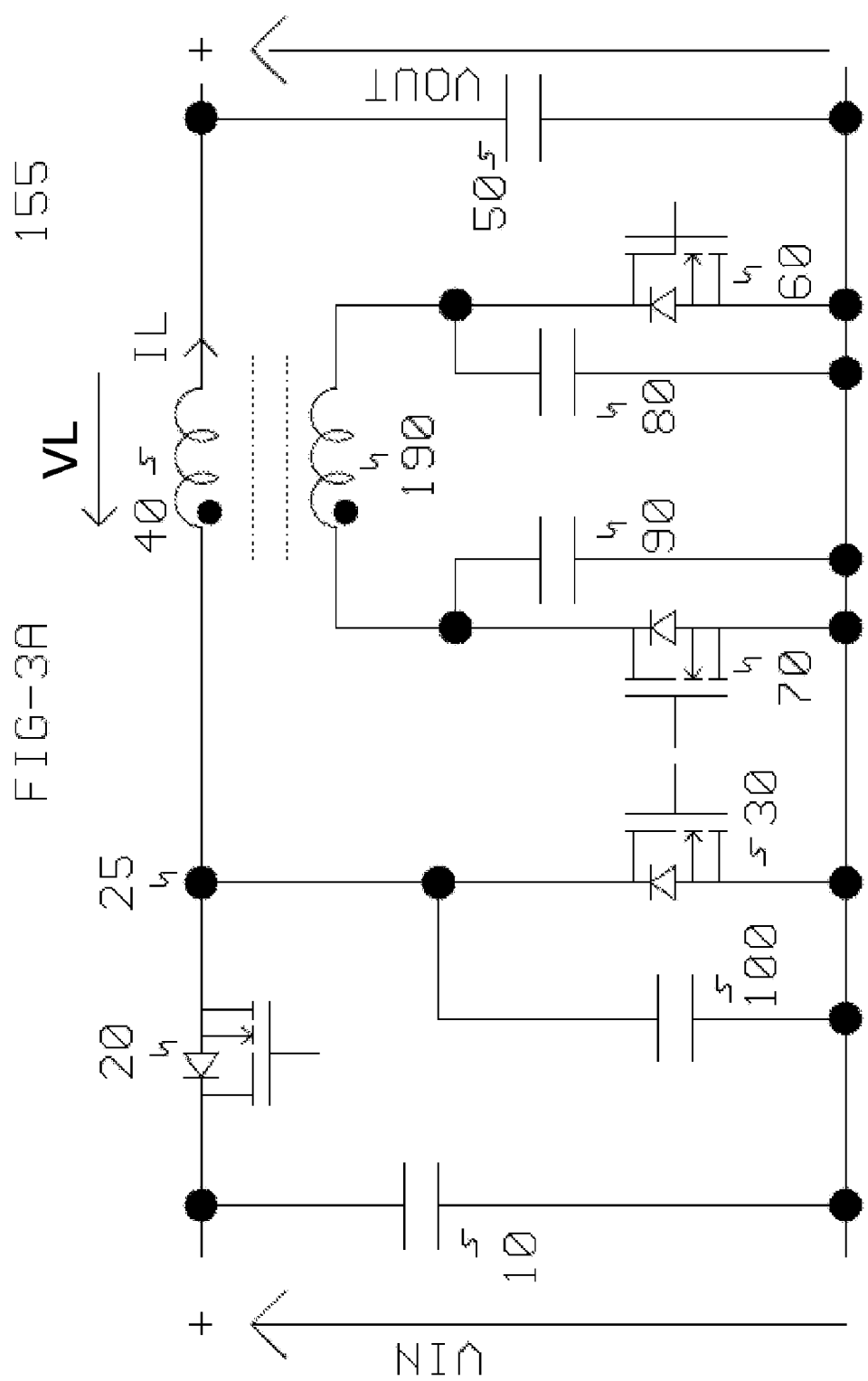
FIG. 3A illustrates a high level schematic diagram of a synchronous buck converter with a pair of magnetically coupled electric coils, according to certain embodiments.

FIG. 3A illustrates a high level schematic diagram of a synchronous buck converter 155 with a pair of magnetically coupled electric coils, according to certain embodiments. Synchronous buck converter 155 comprises: an input capacitor 10; a plurality of electronically controlled switches 20, 30, 60, and 70; a first electric coil 40; an output capacitor 50; a plurality of additional capacitors 80, 90, and 100; and a second electric coil 190. Each of electronically controlled switches 20, 30, 60 and 70 are in one embodiment NMOSFETs.

A first end of input capacitor 10 is connected to the drain of first electronically controlled switch 20. The second end of input capacitor 10 is connected to a first end of capacitor 100, the source of electronically controlled switch 30, the source of electronically controlled switch 70, a first end of capacitor 90, a first end of capacitor 80, the source of electronically controlled switch 60, a first end of output capacitor 50, and a common point, in one embodiment the common point being ground. The source of electronically controlled switch 20 is connected to the drain of electronically controlled switch 30, the second end of capacitor 100, and a first end of first electric coil 40, the junction being denoted 25. The second end of first electric coil 40 is connected to the second end of output capacitor 50. The drain of electronically controlled switch 70 is connected to the second end of capacitor 90 and a first end of second electric coil 190. The second end of second electric coil 190 is connected to the second end of capacitor 80 and the drain of electronically controlled switch 60. The gates of electronically controlled switches 20, 30, 60, and 70, are connected to a control circuitry (not shown) as will be described below in relation to FIG. 12. First and second electric coils 40 and 190 are magnetically coupled and are arranged such that the polarities at the first ends of electric coils 40 and 190 are the same. The voltage across input capacitor 10 is denoted VIN and the voltage across output capacitor 50 is denoted VOUT. The voltage across first electric coil 40, measured from the first end to the second end, is denoted VL and the current flowing therethrough, away from junction 25, is denoted IL. For the sake of simplicity, synchronous buck converter 155 will be described where first electric coil 40 and second electric coil 190 exhibit a winding ratio of 1:1, thereby the voltage across second electric coil 190 is also VL.

FIG. 3B shows a graph of the operation of synchronous buck converter 155, with the x-axis representing time and the y-axis representing voltage and current, in arbitrary units. The graph of FIG. 3B illustrates: the gate-source voltages of electronically controlled switches 20, 30, 60, and 70; voltage VL; and current IL. For the sake of simplicity FIGS. 3A and 3B will be described together.

In operation, at time T1 electric coil 40 voltage VL is equal to VIN−VOUT, i.e. the potential at junction 25 is VIN. First electronically controlled switch 20 is switched on, the switching on thereof being at ZVS since the voltage at junction 25 is equal to voltage VIN, electronically controlled switch 60 is on and electronically controlled switch 70 is off. Since second electric coil 190 is magnetically coupled to storage element electric coil 40, the voltage across second electric coil 190 is similarly VIN−VOUT, and since electronically controlled switch 60 is on, i.e. closed, the voltage across electronically controlled switch 70 is VIN−VOUT.

Responsive to the positive value of first electric coil 40 voltage VL, current IL increases linearly, as described above in relation to FIGS. 1A-1C. At time T2 first electronically controlled switch 20 is switched off and electronically controlled switch 60 is similarly switched off. After time T2 the voltage at junction 25 drops, responsive to the discharging of the capacitance of junction 25. The rate of change of current IL through first electric coil 40 begins to fall, with current IL beginning to decline when the voltage at junction 25 drops below VOUT, i.e. first electric coil 40 voltage VL becomes negative. In one preferred embodiment the on time of first electronically controlled switch 20 is selected such that the maximum value reached by current IL through first electric coil 40 is sufficient to supply the required load current. At time T3, first electric coil 40 voltage VL has fallen to −VOUT, and thus the voltage across second electronically controlled switch 30 is zero, and second electronically controlled switch 30 is turned on by the control circuitry, at ZVS. First electric coil 40 voltage VL is similarly reflected to second electric coil 190, and as a result the voltage across inductor 190 drops after time T2. Capacitor 80 begins to charge and capacitor 90 begins to discharge, the values of capacitors 80 and 90 being selected such that the energy stored in capacitor 90 at time T2 is less than the energy stored in capacitor 80 at time T3, thereby the voltage across electronically controlled switch 70 at time T3 is zero, and switch 70 is thus switched on under ZVS.

Current IL through first electric coil 40, after time T3, flows through second electronically controlled switch 30 at a linearly decreasing amplitude. At time T4, the amplitude of current IL through first electric coil 40 is zero, and then the amplitude of current IL continues to decline, becoming negative, with energy being sourced by output capacitor 50. At time T5 second electronically controlled switch 30 is switched off, responsive to the current reaching IMIN. IMIN should be set such that the voltage reached by junction 25 at time T8 is equal to VIN, as will be described below, under maximum input voltage and maximum output current limits. In one preferred embodiment IMIN is set to be a function of VIN. The voltage at junction 25 rises, responsive to the capacitance of junction 25 being charged, and the rate of change of first electric coil 40 current IL begins to decline, becoming zero at time T6 when the voltage at junction 25 rises to VOUT, i.e. first electric coil 40 voltage VL is zero. The zero voltage drop is reflected to second electric coil 190, and thus the voltage drop across electronically controlled switch 60 is zero, since electronically controlled switch 70 is on. The control circuit, to be described further below, closes electronically controlled switch 60 under ZVS, thus creating an effective short circuit across second electric coil 190, which is reflected to electric coil 40. Since with a short circuit the voltage across second electric coil 190 remains zero, the change in current dI/dt is also zero, which is reflected to first electric coil 40 whose current is diverted to coil 190. At time T7, switch 70 is opened, diverting the current back to coil 40 and removing the short circuit from second electric coil 190, and first electric coil 40 and first electric coil 40 voltage VL again climbs to the value VIN−VOUT and first electric coil current IL begins to rise. At time T8, which is the end of the cycle, equivalent to time T1 described above, the voltage across first electronically controlled switch is again zero, i.e the voltage at junction 25 has reached VIN, and first electronically controlled switch 20 is again closed under ZVS. The operation of electronically controlled switches 60 and 70, which are not involved in charging, or discharging, first electric coil 40, allows for stretching the cycle to T.

Figure 3C:
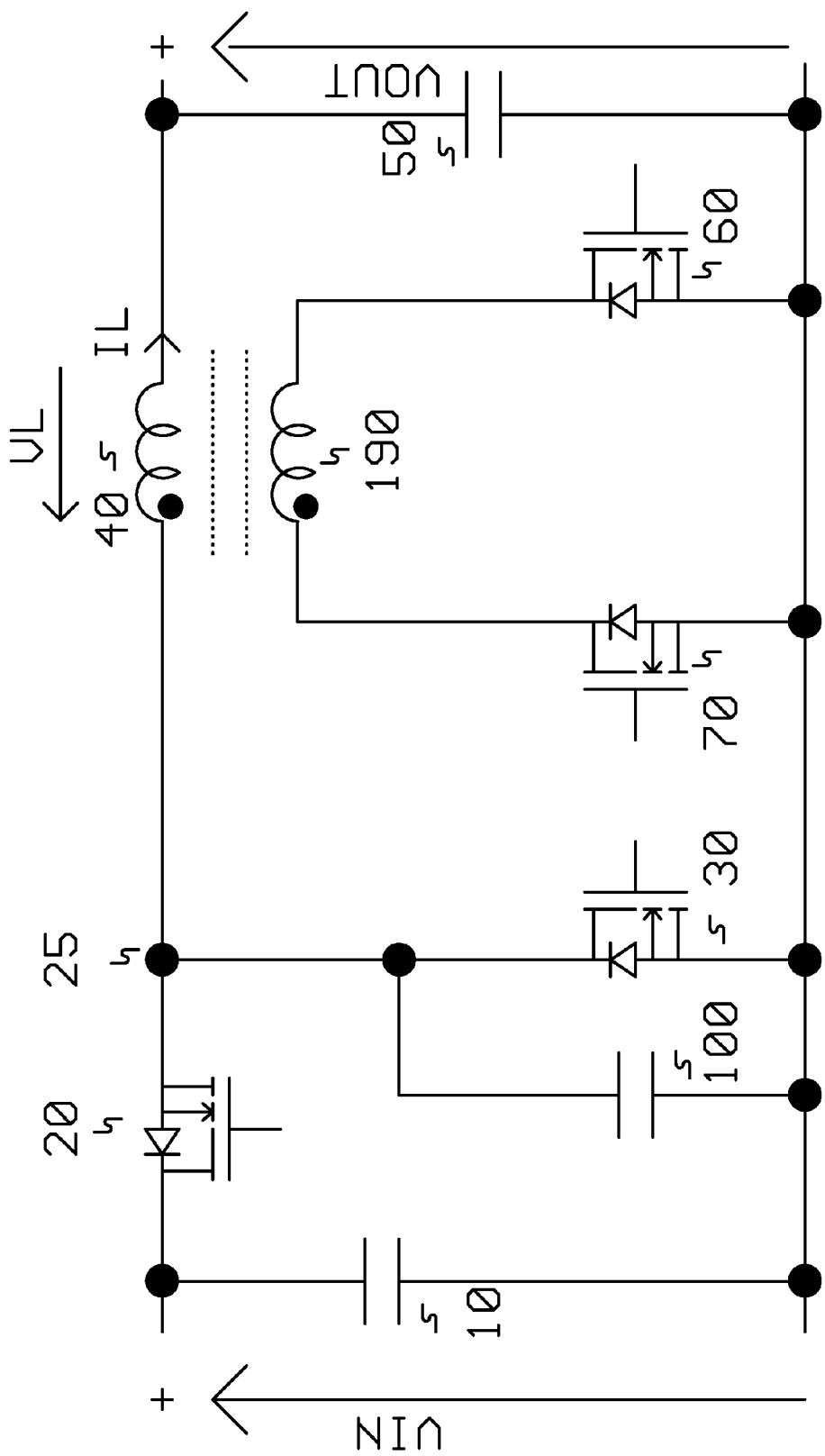
FIG. 3C illustrates a high level schematic diagram of a synchronous buck converter with a pair of magnetically coupled electric coils, and without capacitors in the short circuitry loop, according to certain embodiments.

FIG. 3C illustrates a high level schematic diagram of a synchronous buck converter 165 with a pair of magnetically coupled electric coils, and without additional capacitors in the short circuit path, according to certain embodiments and FIG. 3D shows a graph of the operation of synchronous buck converter 165 of FIG. 3C, where the x-axis represents time and the y-axis represents voltage and current, in arbitrary values. For the sake of simplicity FIGS. 3C and 3D will be described together. The construction of synchronous buck converter 165 is in all respects similar to the construction of synchronous buck converter 155 of FIG. 3A, with the exception that capacitors 80 and 90 are not provided. The graph of FIG. 3D illustrates: the gate-source voltages of electronically controlled switches 20, 30, 60, and 70; voltage VL; and current IL.

In operation, synchronous buck converter 165 operates in all respects similar to the operation of synchronous buck converter 155, as described above in relation to FIGS. 3A and 3B, with the exception that electronically controlled switch 60 is not switched off at time T2 and electronically controlled switch 70 is not switched on at time T3. As described above, at time T2 electronically controlled switch 20 is switched off, thereby causing voltage VL to drop until it reaches −VOUT at time T3. In synchronous buck converter 165 electronically controlled switch 60 is switched off and electronically controlled switch 70 is switched on when voltage VL reaches zero. Since voltage VL is zero and the voltage across electronically controlled switch 60 is zero, the voltage across electronically controlled switch 70 is also zero. Thus the switching on of electronically controlled switch 70 is under ZVS.

Figure 4A:
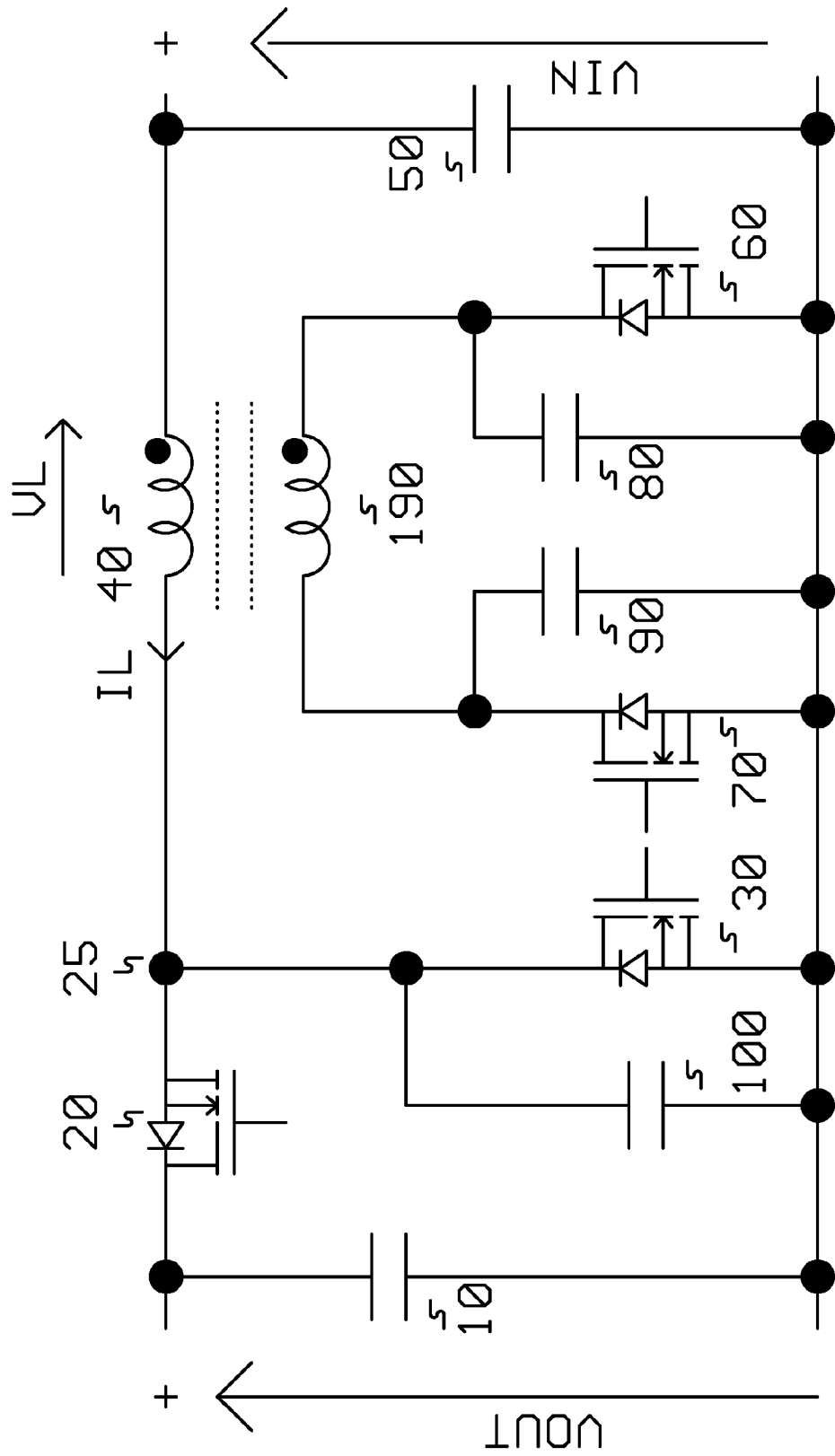
FIG. 4A illustrates a high level schematic diagram of a synchronous boost converter with a pair of magnetically coupled electric coils, according to certain embodiments.

FIG. 4A illustrates a high level schematic diagram of a synchronous boost converter 200, according to certain embodiments, and FIG. 4B shows a graph of the operation of synchronous boost converter 200 of FIG. 4A, where the x-axis represents time and the y-axis represents voltage. For the sake of simplicity FIGS. 4A and 4B will be described together. The construction of synchronous boost converter 200 is in all respects similar to the construction of synchronous buck converter 155 of FIG. 3A, with the exception that: capacitor 10 is an output capacitor, and the voltage there across is denoted VOUT; capacitor 50 is an input capacitor, and the voltage there across is denoted VIN; and the polarities of electric coils 40 and 190 are reversed. The graph of FIG. 4B illustrates: the gate-source voltages of electronically controlled switches 20, 30, 60, and 70; voltage VL; and current IL.

In operation, at time T1 first electric coil 40 voltage VL is VIN, the potential at junction 25 thus being zero. Electronically controlled switch 30 is switched on, the switching on thereof being at ZVS, electronically controlled switch 60 is off and electronically controlled switch 70 is on. Since second electric coil 190 is magnetically coupled to first electric coil 40, the voltage across second electric coil 190 is similarly VIN, and since electronically controlled switch 70 is on, i.e. closed, the voltage across electronically controlled switch 60 is VIN.

Responsive to the positive voltage of first electric coil 40, current IL increases linearly. At time T2 electronically controlled switch 30 is switched off, and electronically controlled switch 70 is similarly switched off. After time T2, the voltage at junction 25 begins to rise, responsive to the charging of the capacitance of junction 25. The rate of change of first electric coil 40 current IL begins to fall, the current beginning to decline when the voltage at junction 25 reaches VIN, i.e. when first electric coil 40 voltage VL becomes negative. In one preferred embodiment the on time of first electronically controlled switch 20 is selected such that the maximum value reached by current IL is sufficient to supply the required load current. At time T3, first electric coil 40 voltage VL has fallen to −(VOUT−VIN), and thus the voltage across electronically controlled switch 20 is zero, and electronically controlled switch 20 is turned on by the control circuitry, under ZVS. First electric coil 40 voltage VL is similarly reflected to second electric coil 190, and as a result the voltage across inductor 190 drops after time T2. Capacitor 90 begins to charge and capacitor 80 begins to discharge, the values of capacitors 80 and 90 being selected such that the energy stored in capacitor 80 at time T2 is less than the energy stored in capacitor 90 at time T3, thereby the voltage across electronically controlled switch 60 at time T3 is zero, and switch 60 is thus switched on under ZVS. Current IL through first electric coil 40, after time T3, flows through electronically controlled switch 20 at a linearly decreasing amplitude. At time T4, the amplitude of current IL through first electric coil 40 is zero, and then the amplitude of current IL continues to decline, becoming negative, with energy being sourced by output capacitor 10. At time T5 electronically controlled switch 20 is switched off, responsive to current IL through first electric coil 40 reaching IMIN. IMIN is preferably set such that the voltage reached by junction 25 is zero at time T8, as will be described below, under maximum input voltage and maximum output current limits. In one preferred embodiment IMIN is set to be a function of VIN. The voltage at junction 25 drops as the capacitance of junction 25 is discharged, and the rate of change of first electric coil 40 current IL begins to decline, becoming zero when the voltage at junction 25 drops to VIN at time T6, i.e. first electric coil 40 voltage VL becomes zero. The zero voltage drop is reflected to second electric coil 190, and thus the voltage drop across electronically controlled switch 70 is zero, since electronically controlled switch 60 is on. The control circuit, to be described further below, closes electronically controlled switch 70 under ZVS, thus creating an effective short circuit across second electric coil 190, which is reflected to first electric coil 40. Since with a short circuit the voltage across second electric coil 190 remains zero, the change in current dI/dt is also zero. At time T7, switch 60 is opened, thus removing the short circuit from second electric coil 190 and first electric coil 40, and voltage VL again climbs to the value VIN and current IL begins to rise. At time T8, which is the end of the cycle, equivalent to time T1 described above, the voltage across electronically controlled switch 30 is again zero, i.e the voltage at junction 25 has reached zero, and electronically controlled switch 30 is again closed under ZVS. The operation of electronically controlled switches 60 and 70, which are not involved in charging, or discharging, first electric coil 40, allows for stretching the cycle to T.

FIG. 4C illustrates a high level schematic diagram of a synchronous boost converter 210 according to certain embodiments, without capacitors in the short circuitry loop, and FIG. 4D shows a graph of the operation of synchronous boost converter 210 of FIG. 4C, where the x-axis represents time and the y-axis represents voltage and current, in arbitrary units. For the sake of simplicity FIGS. 4C and 4D will be described together. The construction of synchronous boost converter 210 is in all respects similar to the construction of synchronous boost converter 200 of FIG. 4A, with the exception that capacitors 80 and 90 are not provided. The graph of FIG. 4D illustrates: the gate-source voltages of electronically controlled switches 20, 30, 60, and 70; voltage VL; and current IL.

In operation, synchronous boost converter 210 operates in all respects similar to the operation of synchronous boost converter 200, as described above in relation to FIGS. 4A and 4B, with the exception that electronically controlled switch 70 is not switched off at time T2 and electronically controlled switch 60 is not switched on at time T3. As described above, at time T2 electronically controlled switch 30 is switched off, thereby causing first electric coil 40 voltage VL to drop until it reaches −(VOUT−VIN) at time T3. In synchronous boost converter 210 electronically controlled switch 70 is switched off and electronically controlled switch 60 is switched on when voltage VL reaches zero. Since voltage VL is zero and the voltage across electronically controlled switch 70 is zero, the voltage across electronically controlled switch 60 is also zero. Thus the switching on of electronically controlled switch 60 is under ZVS.

FIG. 5A illustrates a high level schematic diagram of a synchronous flyback converter 300, comprising: an input capacitor 10; a plurality of electronically controlled switches 20, 30, 60 and 70; a plurality of electric coils 40, 180, and 190; an output capacitor 50; and a plurality of additional capacitors 80, 90, 100, and 110. Each of electronically controlled switches 20, 30, 60 and 70 are in one embodiment constituted of an NMOSFET.

A first end of input capacitor 10 is connected to a first end of electric coil 40. The second end of input capacitor 10 is connected to a first end of capacitor 100, the source of electronically controlled switch 20, and a common point, in one embodiment the common point being ground. The second end of capacitor 100 is connected to the second end of electric coil 40 and the drain of electronically controlled switch 20, the junction being denoted 25. A first end of output capacitor 50 is connected to a first end of electric coil 180. The second end of output capacitor 50 is connected to the source of electronically controlled switch 30, a first end of capacitor 110, and the common point. The second end of electric coil 180 is connected to the second end of capacitor 110 and the drain of electronically controlled switch 30, the junction being denoted 35. A first end of electric coil 190 is connected to a first end of capacitor 90 and the drain of electronically controlled switch 70. The second end of capacitor 90 is connected to the source of electronically controlled switch 70, a first end of capacitor 80, the source of electronically controlled switch 60, and the common point. The second end of capacitor 80 is connected to the second end of electric coil 190 and the drain of electronically controlled switch 60. The gates of electronically controlled switches 20, 30, 60, and 70 are connected to a control circuit (not shown) as will be described below in relation to FIG. 12. Electric coils 40, 180, and 190 are magnetically coupled to each other, and for the sake of simplicity synchronous flyback converter 300 will be described where electric coils 40, 180, and 190 exhibit winding ratios of 1:1:1, and are arranged such that the polarities at the first end of electric coil 40, the second end of electric coil 180, and the first end of electric coil 190 are the same. The voltage across input capacitor 10 is denoted VIN and the voltage across output capacitor 50 is denoted VOUT. The voltage across electric coil 40, measured from the first end to the second end is denoted VL. The current flowing through electric coil 40 is denoted IP and the current flowing through electric coil 180 is denoted IS.

FIG. 5B shows a graph of the operation of synchronous flyback converter 300 of FIG. 5A, where the x-axis represents time and the y-axis represents voltage in arbitrary units. The graph of FIG. 5B illustrates: the gate-source voltages of electronically controlled switches 20, 30, 60, and 70; and voltage VL. For the sake of simplicity, the operation of FIGS. 5A and 5B will be described together.

At time T1 electric coil 40 voltage VL is VIN, the potential at junction 25 thus being zero. Electronically controlled switch 20 is switched on, the switching on thereof being under ZVS since the voltage there across is zero. Electronically controlled switch 60 is on and electronically controlled switch 70 is off. Since electric coil 190 is magnetically coupled to electric coil 40, the voltage across electric coil 190 is similarly VIN, and since electronically controlled switch 60 is on, i.e. closed, the voltage across electronically controlled switch 70 is VIN. The voltage across electric coil 180 is similarly VIN.

Responsive to the positive voltage of electric coil 40, electric coil 40 current IP increases linearly. At time T2 first electronically controlled switch 20 is switched off and electronically controlled switch 60 is similarly switched off. In one preferred embodiment the on time of electronically controlled switch 20 is arranged such that electric coil 40 current IP rises to the minimum value necessary for providing the desired output voltage VOUT, at time T2. Electric coil 40 current IP is thus diverted to electric coil 180 as current IS, thereby discharging capacitor 110, the potential at junction 35 thus dropping, becoming zero at time T3, as voltage VL falls to −VOUT. Capacitor 80 begins to charge and capacitor 90 begins to discharge, the values of capacitors 80 and 90 being selected such that the energy stored in capacitor 90 at time T2 is less than the energy stored in capacitor 80 at time T3, thereby the voltage across electronically controlled switch 70 at time T3 is zero, and switch 70 is thus switched on under ZVS.

Electric coil 180 current IS after time T3 flows through electronically controlled switch 30 at a linearly decreasing amplitude. At time T4, the amplitude of electric coil 180 current IS is zero, and continues to decline, becoming negative, with energy being sourced by output capacitor 50. At time T5 second electronically controlled switch 30 is switched off, responsive to the current reaching IMIN. IMIN should be set such that the voltage at junction 25 reached at time T8 is zero, under maximum input voltage and maximum output current limits. In one preferred embodiment IMIN is set to be a function of VIN. The voltage at junction 35 rises, responsive to the charging of the capacitance of junction 35, and the rate of change of electric coil 180 current IS begins to decline, becoming zero when the voltage at junction 35 rises to VOUT at time T6, i.e. electric coil 180 voltage VL becomes zero. The zero voltage drop is reflected to electric coil 190, and thus the voltage drop across electronically controlled switch 60 is zero, since electronically controlled switch 70 is on. The control circuit, to be described further below, closes electronically controlled switch 60 under ZVS, thus creating an effective short circuit across electric coil 190, which is reflected to electric coil 40 and electric coil 180. Since with a short circuit the voltage across electric coil 190 remains zero, the change in current dI/dt is also zero. At time T7, switch 70 is opened, thus removing the short circuit from electric coils 190, 180 and 40, and current IP discharges the capacitance at junction 25, shown as capacitor 100, thereby electric coil 40 voltage VL again climbs to the value VIN. At time T8, which is the end of the cycle, equivalent to time T1 described above, the voltage across electronically controlled switch 20 is again zero, i.e the voltage at junction 25 has reached zero, and electronically controlled switch 20 is again closed under ZVS. The operation of electronically controlled switches 60 and 70 which are not involved in charging, or discharging, electric coil 40, allows for stretching the cycle to T.

Figure 5C:
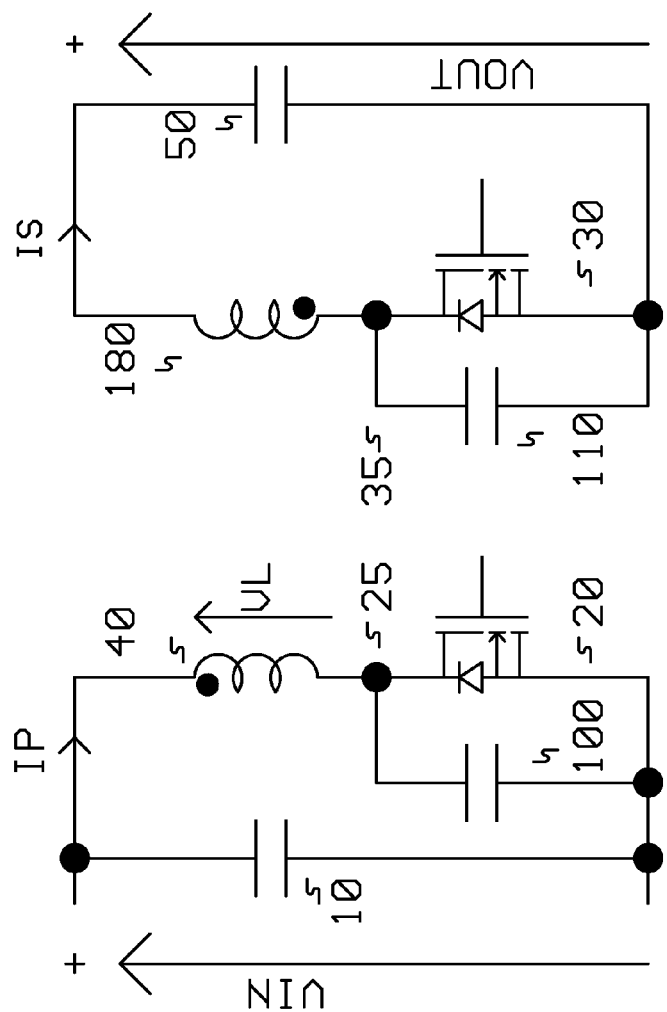
FIG. 5C illustrates a high level schematic diagram of a synchronous flyback converter, with a plurality of magnetically coupled electric coils and without storage capacitors in the short circuitry loop, according to certain embodiments.
Figure 5D:
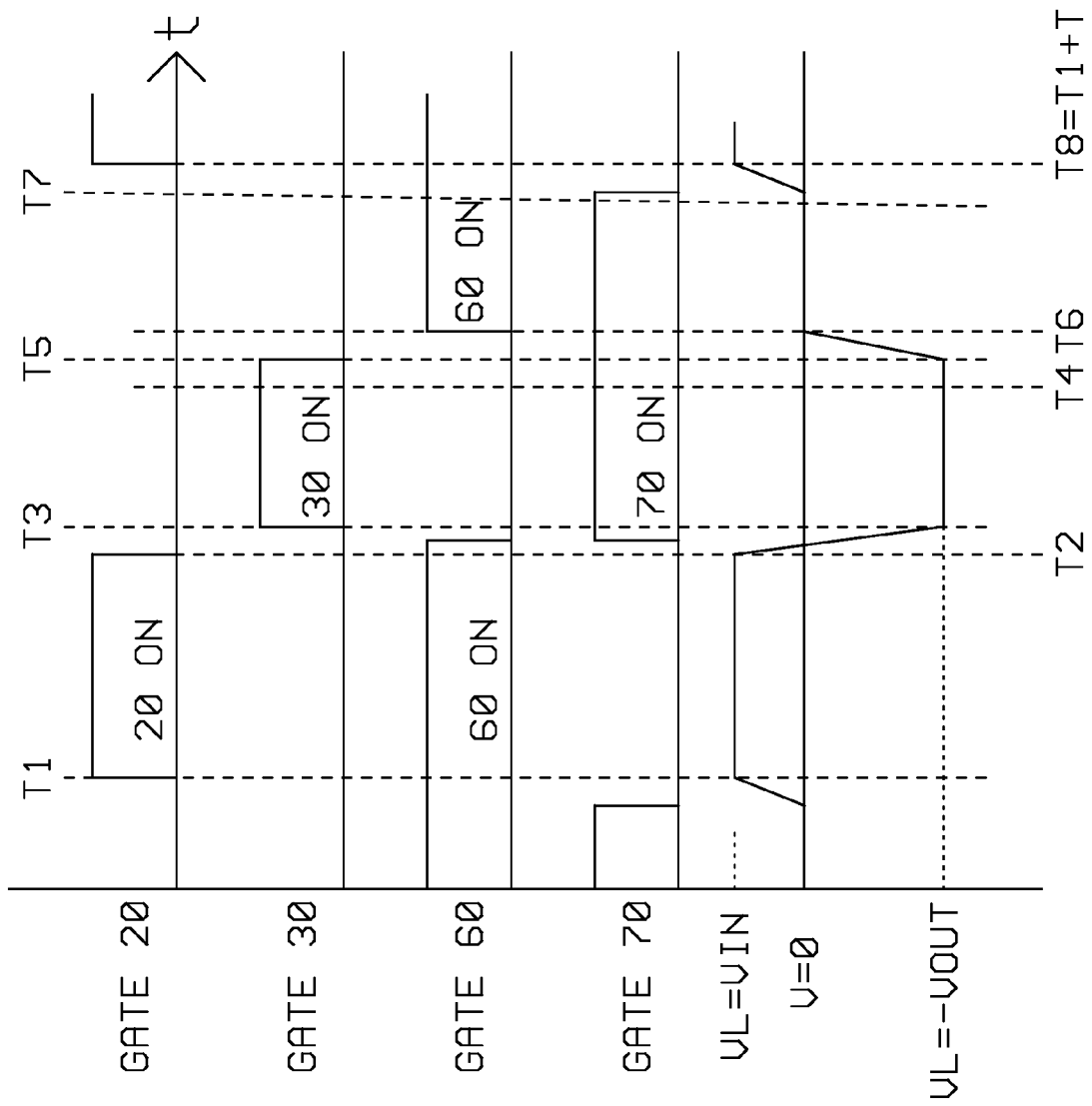
FIG. 5D shows a graph of the operation of the synchronous flyback converter of FIG. 5C according to certain embodiments.

FIG. 5C illustrates a high level schematic diagram of a synchronous flyback converter 310 without capacitors in the short circuitry loop, according to certain embodiments, and FIG. 5D shows a graph of the operation of synchronous flyback converter 310 of FIG. 5C, where the x-axis represents time and the y-axis represents voltage in arbitrary units. For the sake of simplicity FIGS. 5C and 5D will be described together. The construction of synchronous flyback converter 310 is in all respects similar to the construction of synchronous flyback converter 300 of FIG. 5A, with the exception that capacitors 80 and 90 are not provided. The graph of FIG. 5D illustrates: the gate-source voltages of electronically controlled switches 20, 30, 60, and 70; and voltage VL.

In operation, synchronous flyback converter 310 operates in all respects similar to the operation of synchronous flyback converter 300, as described above in relation to FIGS. 5A and 5B, with the exception that electronically controlled switch 60 is not switched off at time T2 and electronically controlled switch 70 is not switched on at time T3. As described above, at time T2 electronically controlled switch 20 is switched off, thereby causing voltage VL to drop until it reaches −VOUT at time T3. In synchronous flyback converter 310 electronically controlled switch 60 is switched off and electronically controlled switch 70 is switched on when voltage VL reaches zero. Since voltage VL is zero and the voltage across electronically controlled switch 60 is zero, the voltage across electronically controlled switch 70 is also zero. Thus the switching on of electronically controlled switch 70 is under ZVS.

Figure 6A:
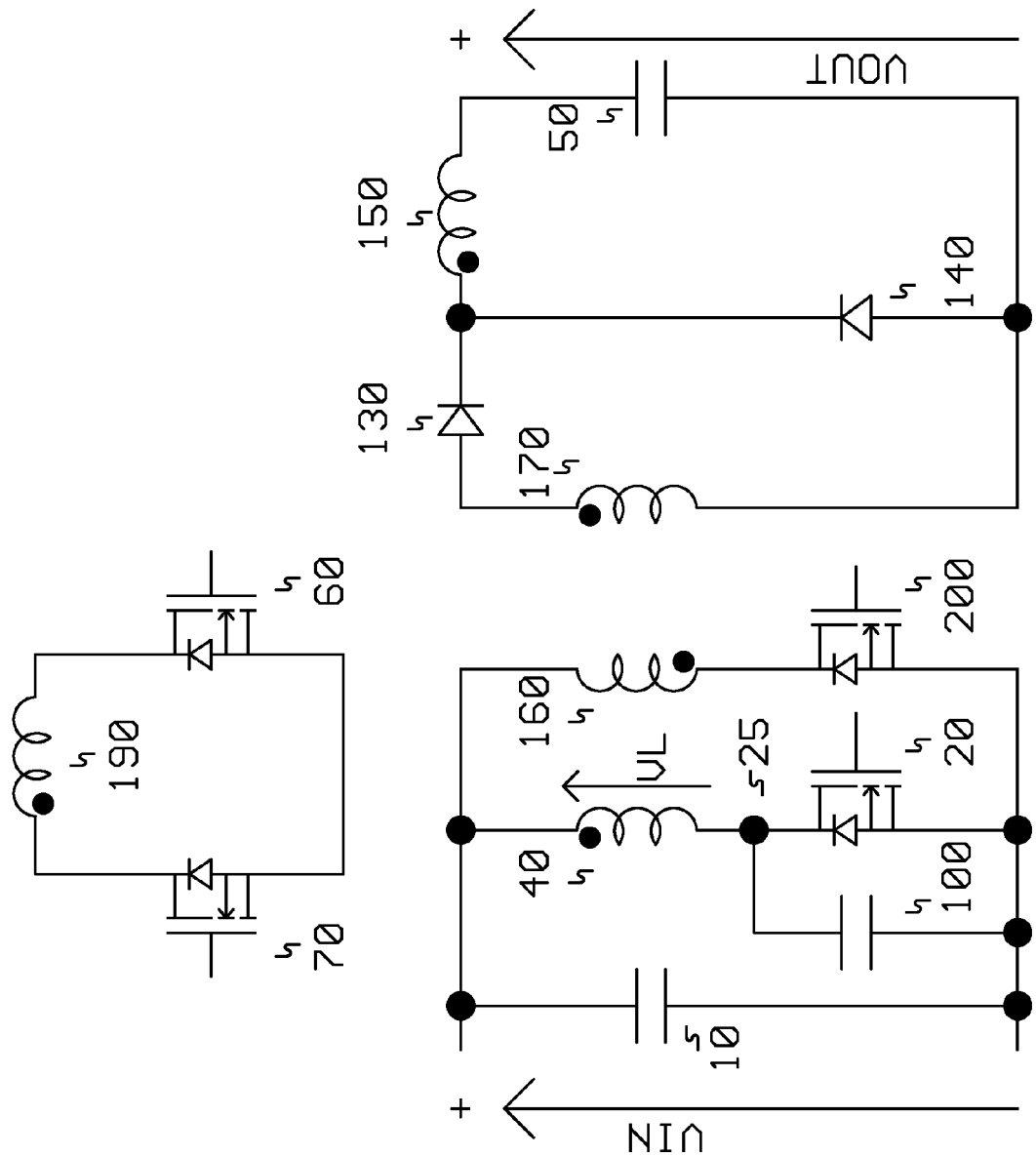
FIG. 6A illustrates a high level schematic diagram of a single ended forward converter with a plurality of magnetically coupled electric coils, according to certain embodiments.

FIG. 6A illustrates a high level schematic diagram of a single ended forward converter 400 with a plurality of magnetically coupled electric coils, according to certain embodiments, comprising: an input capacitor 10; a plurality of electronically controlled switches 20, 60, 70, and 200; an electric coil 150 and a plurality of electric coils 40, 160, 170, and 190; an output capacitor 50; a capacitor 100; and a pair of diodes 130 and 140. In one embodiment electronically controlled switches 20, 60, 70, and 200 are NMOSFETs.

A first end of input capacitor 10 is connected to a first end of electric coil 40 and to a first end of electric coil 160. The second end of input capacitor 10 is connected to a first end of capacitor 100, the source of electronically controlled switch 20, the source of electronically controlled switch 200, and a common point, in one embodiment the common point being ground. The second end of capacitor 100 is connected to the second end of electric coil 40 and the drain of electronically controlled switch 20, the junction being denoted 25. The second end of electric coil 160 is connected to the drain of electronically controlled switch 200. A first end of electric coil 170 is connected to the anode of diode 130. The second end of electric coil 170 is connected to the anode of diode 140, a first end of output capacitor 50, and the common point. The cathode of diode 140 is connected to the cathode of diode 130 and a first end of electric coil 150. The second end of electric coil 150 is connected to the second end of output capacitor 50. A first end of electric coil 190 is connected to the drain of electronically controlled switch 70 and the second end of electric coil 190 is connected to the drain of electronically controlled switch 60. The source of electronically controlled switch 60 is connected to the source of electronically controlled switch 70 and the common point. Electric coils 40, 160, 170, and 190 are magnetically coupled, and are arranged such that the polarities at the first end of electric coil 40, the second end of electric coil 160, the first end of electric coil 170, and the first end of electric coil 190 are the same. The voltage across electric coil 40, measured from the first end to the second end is denoted VL. For simplicity, forward converter 400 will be described where electric coils 40, 160, 170 and 190 exhibit winding ratios of 1:1:1:1, however this is not meant to be limiting in any way.

FIG. 6B shows a graph of the operation of single ended forward converter 400 of FIG. 6A, where the x-axis represents time and the y-axis represents voltage in arbitrary units. The graph of FIG. 6B illustrates: the gate-source voltages of electronically controlled switches 20, 60, 70, and 200; and voltage VL. For the sake of simplicity the operation of FIGS. 6A and 6B will be described together.

In operation, at time T1 voltage VL is VIN, the potential at junction 25 thus being zero. Electronically controlled switch 20 is switched on, the switching thereof being accomplished at ZVS since the voltage there across is zero. Electronically controlled switch 60 is on and electronically controlled switch 70 is off. Additionally, electronically controlled switch 200 is off, therefore the operation of single ended forward converter 400 is at this stage similar to the operation of a standard single ended forward converter known to the prior art.

At time T2 electronically controlled switch 20 is switched off. The voltage at junction 25 rises, responsive to the charging of the capacitance of junction 25, and voltage VL thus begins to drop. When voltage VL becomes zero, the voltage across electric coil 190 is also zero. Since the voltage across electronically controlled switch 60 is zero, the voltage across electronically controlled switch 70 is also zero.

Electronically controlled switch 70 is switched on, the switching thereof being accomplished at ZVS, since the voltage there across is zero. Electronically controlled switch 60 is switched off. The capacitance of junction 25 continues to charge, reaching 2*VIN at time T3, voltage VL then being −VIN and the potential at the drain of electronically controlled switch 200 becomes zero. At time T3 electronically controlled switch 200 is switched on, the switching on thereof being accomplished at ZVS since the voltage there across is zero.

As known to those skilled in the art, in a single ended forward converter the magnetic energy stored during the on time of electronically controlled switch 20, must be discharged by the end of the cycle. Methods for doing so are described in numerous articles, including U.S. Pat. No. 4,441, 146, issued Apr. 3, 1984 to Vinciarelli, the entire contents of which are incorporated herein by reference. In the present embodiment the stored energy is discharged through electric coil 160 and the current through electric coil 160 decreases linearly over time, becoming zero at time T4. The current continues to decline, becoming negative after time T4. The on time of electronically controlled switch 200 is selected such that the current level reached at time T5 is the minimum negative current necessary to discharge the capacitance of junction 25 enough so that the potential at junction 25 reaches zero at time T8, as will be described further hereinto below. At time T5 electronically controlled switch 200 is switched off, and the voltage at junction 25 begins to drop, responsive to the discharging of the capacitance of junction 25, and reaches VIN at time T6. Thus, voltage VL rises, reaching zero at time T6. The voltage across electric coil 190 is thereby also zero, and since the voltage across electronically controlled switch 70 is zero, the voltage across electronically controlled switch 60 is also zero.

Electronically controlled switch 60 is now switched on, the switching on thereof being accomplished at ZVS, since the voltage there across is zero. The current flowing through electric coil 160 is now diverted to electric coil 190, the current maintaining a fixed value as long as voltage VL is zero. At time T7 electronically controlled switch 70 is switched off, thereby the current flowing through electric coil 190 is diverted to electric coil 40. The voltage at junction 25 continues to drop, responsive to the discharging of the capacitance of junction 25 and reaching zero at time T8. Voltage VL thus rises, reaching VIN at time T8. Electronically controlled switch 20 is now switched on, the switching on thereof being ZVS since the voltage there across is zero.

The operation of electric coils 150 and 170, in cooperation with diodes 130 and 140, are well known to those skilled in the art. The voltage across electric coil 170 is VL. When voltage VL is VIN diode 130 conducts and the current flowing through electric coil 150 rises. When voltage VL is equal to −VIN diode 130 does not conduct and diode 140 does conduct, thereby the current flowing through electric coil 150 decreases.

FIG. 7 illustrates a high level schematic diagram of a full bridge phase shift converter 500, according to the prior art. Full bridge phase shift converter 500 comprises: an input capacitor 10; an output capacitor 50; a pair of diodes 130 and 140; a plurality of additional capacitors 220, 230, 270, and 280; a plurality of electronically controlled switches 240, 250, 290, and 300; and a plurality of electric coils 150, 260, 310, and 320. Electronically controlled switches 240, 250, 290, and 300 are typically NMOSFETs.

A first end of input capacitor 10 is connected to a first end of capacitor 220, the drain of electronically controlled switch 240, a first end of capacitor 270, and the drain of electronically controlled switch 290. The second end of input capacitor 10 is connected to a first end of capacitor 230, the source of electronically controlled switch 250, a first end of capacitor 280, the source of electronically controlled switch 300, and a common point (not shown) usually being ground. The second end of capacitor 220 is connected to the second end of capacitor 230, the source of electronically controlled switch 240, the drain of electronically controlled switch 250, and a first end of electric coil 260. The second end of electric coil 260 is connected to the second end of capacitor 270, the second end of capacitor 280, the source of electronically controlled switch 290, and the drain of electronically controlled switch 300. A first end of output capacitor 50 is connected to a first end of electric coil 150 and the second end of output capacitor 50 is connected to a first end of electric coil 310, a first end of electric coil 320, and the common point. The second end of electric coil 150 is connected to the cathode of diode 130 and the cathode of diode 140. The second end of electric coil 310 is connected to the anode of diode 130 and the second end of electric coil 320 is connected to the anode of diode 140. Electric coils 260, 310, and 320 are magnetically coupled and are arranged such that the polarities at the second end of electric coil 260, the second end of electric coil 310 and the first end of electric coil 320 are the same. Full bridge phase shift converter 500 allows for ZVS while working at a fixed frequency, at least over a range of input voltage and output current. The operation of full bridge phase converter 500 is well known to the prior art and will not be further described for the sake of brevity.

Figure 8A:
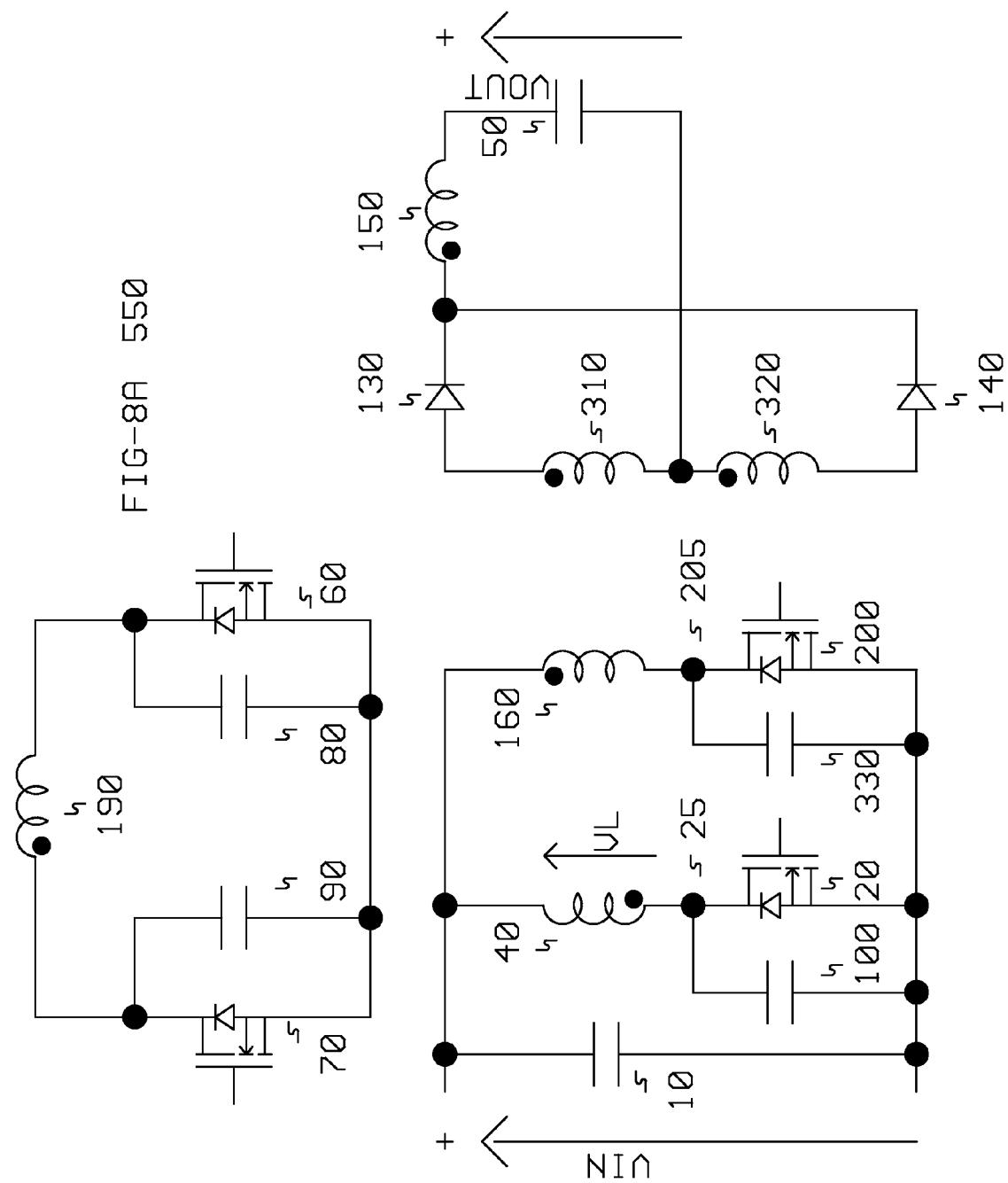
FIG. 8A illustrates a high level schematic diagram of a push-pull converter with a plurality of magnetically coupled electric coils, according to certain embodiments.

FIG. 8A illustrates a high level schematic diagram of a push-pull converter 550 with a plurality of magnetically coupled electric coils, according to certain embodiments. As will be described below, the construction and operation of push-pull converter 550 allows for zero voltage switching (ZVS), similar to full bridge phase shift converter 500 of FIG. 7 over a range of input voltage and load currents. Push-pull converter 550 comprises: an input capacitor 10; a plurality of electronically controlled switches 20, 60, 70, and 200; an electric coil 150 and a plurality of electric coils 40, 160, 190, 310, and 320; an output capacitor 50; a plurality of additional capacitors 80, 90, 100, and 330; and a pair of diodes 130 and 140. In one embodiment electronically controlled switches 20, 60, 70, and 200 are constituted of NMOSFETs.

A first end of input capacitor 10 is connected to a first end of electric coil 40 and to a first end of electric coil 160, denoted with a dot for polarity. The second end of input capacitor 10 is connected to a first end of capacitor 100, the source of electronically controlled switch 20, a first end of capacitor 330, the source of electronically controlled switch 200, and to a common point (not shown), in one embodiment the common point being ground. The second end of capacitor 100 is connected to the second end of electric coil 40, denoted with a dot for polarity, and to the drain of electronically controlled switch 20, the junction being denoted 25. The second end of electric coil 160 is connected to the drain of electronically controlled switch 200 and the second end of capacitor 330, the junction being denoted 205. A first end of electric coil 310, denoted with a dot for polarity, is connected to the anode of diode 130. The second end of electric coil 310 is connected to a first end of electric coil 320, denoted with a dot for polarity, a first end of output capacitor 50, and the common point. The second end of electric coil 320 is connected to the anode of diode 140. A first end of electric coil 150, denoted with a dot for polarity, is connected to the cathode of diode 130 and the cathode of diode 140. The second end of electric coil 150 is connected to the second end of output capacitor 50. A first end of electric coil 190, denoted with a dot for polarity, is connected to the drain of electronically controlled switch 70 and a first end of capacitor 90. The second end of electric coil 190 is connected to the drain of electronically controlled switch 60 and a first end of capacitor 80. The source of electronically controlled switch 60 is connected to the second end of capacitor 80, the second end of capacitor 90, the source of electronically controlled switch 70 and the common point. Electric coils 40, 160, 310, 320 and 190 are magnetically coupled, and illustrated without limitation in an embodiment with turns ratio of 1:1:1:1:1. The voltage across electric coil 40, measured from the first end to the second end, is denoted VL.

FIG. 8B shows a graph of the operation of push-pull converter 550 of FIG. 8A, where the x-axis represents time and the y-axis represents voltage in arbitrary units. The graph of FIG. 8B illustrates: the gate-source voltages of electronically controlled switches 20, 60, 70, and 200; and voltage VL. For the sake of simplicity the operation of FIGS. 8A and 8B will be described together.

In operation, at time T1 voltage VL is VIN, the potential at junction 25 thus being zero. Electronically controlled switch 20 is switched on, the switching thereof being accomplished at ZVS since the voltage there across is zero. Electronically controlled switch 70 is on and electronically controlled switch 60 is off.

At time T2, selected responsive to the control circuitry feedback loop to maintain the output voltage, as will be described further below, electronically controlled switch 20 is switched off. The potential at junction 25 begins to rise, responsive to the charging of the capacitance of junction 25, reaching VIN at time T3, i.e. voltage VL drops to zero at time T3. When voltage VL becomes zero, the voltage across electric coil 190 is also zero. Since the voltage across electronically controlled switch 70 is zero, the voltage across electronically controlled switch 60 is also zero. Electronically controlled switch 60 is switched on, the switching thereof being accomplished at ZVS. The current flowing through electric coil 150 is reflected now to electric coil 190.

At time T4 electronically controlled switch 70 is switched off. The voltage at junction 25 rises, responsive to the charging of the capacitance of junction 25, until reaching 2*VIN at time T5, i.e. voltage VL is equal to −VIN, symmetric with time T1. Additionally, after time T4, the voltage at junction 205 drops, responsive to the discharging of the capacitance of junction 205, reaching zero at time T5. Electronically controlled switch 200 is switched on, the switching on thereof being accomplished at ZVS since the voltage there across is zero.

At time T6 electronically controlled switch 200 is switched off. The voltage at junction 25 begins to drop, responsive to the discharging of the capacitance of the junction, until reaching VIN at time T7, i.e. at time T7 voltage VL becomes zero. Since voltage VL is zero, the voltage across electric coil 190 is also zero. Since the voltage across electronically controlled switch 60 is zero, the voltage across electronically controlled switch 70 is also zero. Electronically controlled switch 70 is switched on, the switching on thereof being accomplished at ZVS, since the voltage there across is zero. Voltage VL is thus clamped at zero, and the current flowing through electric coil 150 is reflected now to electric coil 190.

At time T8 electronically controlled switch 60 is switched off and the voltage at junction 25 continues to drop, responsive to the discharging of the capacitance of junction 25, reaching zero at time T9, i.e. at time T9 voltage VL rises to VIN. Electronically controlled switch 20 is switched on at time T9; the switching on thereof being ZVS since the voltage there across is zero.

Figure 9A:
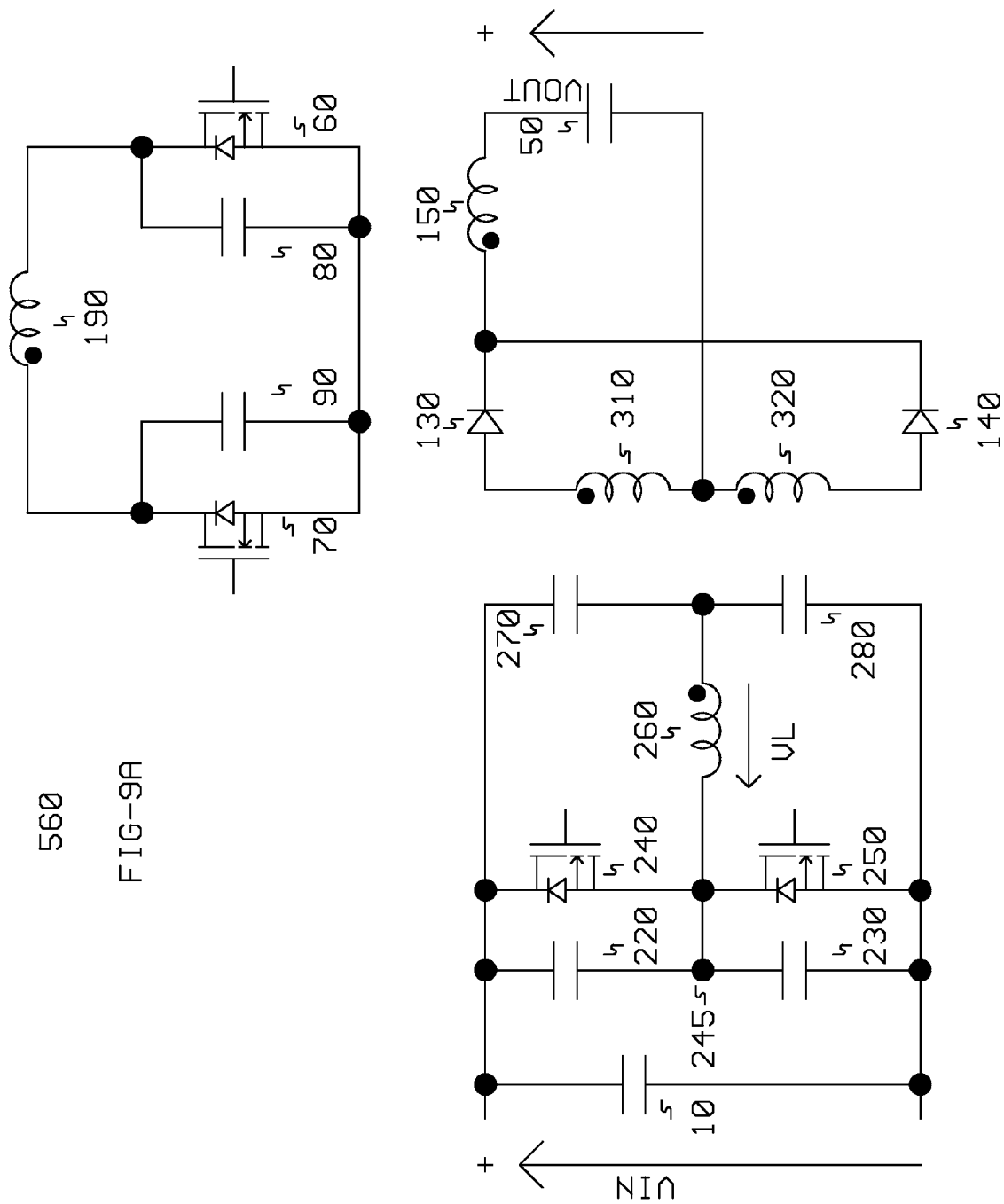
FIG. 9A illustrates a high level schematic diagram of a half bridge converter with a plurality of magnetically coupled electric coils, according to certain embodiments.

FIG. 9A illustrates a half bridge phase shift converter 560, according to certain embodiments. The construction and operation of half bridge phase shift converter 560, as will be described further hereinto below, allows for zero voltage switching (ZVS) similar to full bridge phase shift converter of FIG. 7 over a range of input voltage and output currents. Half bridge converter 560 comprises: an input capacitor 10; an output capacitor 50; a pair of diodes 130 and 140; a plurality of additional capacitors 80, 90, 220, 230, 270, and 280; a plurality of electronically controlled switches 60, 70, 240, and 250; and a plurality of electric coils 150, 190, 260, 310, and 320. Electronically controlled switches 60, 70, 240 and 250 are in one embodiment constituted of NMOSFETs.

A first end of input capacitor 10 is connected to a first end of capacitor 220, the drain of electronically controlled switch 240, and a first end of capacitor 270. The second end of input capacitor 10 is connected to a first end of capacitor 230, the source of electronically controlled switch 250, a first end of capacitor 280, and a common point (not shown), in one embodiment the common point being ground. The second end of capacitor 220 is connected to the second end of capacitor 230, the source of electronically controlled switch 240, the drain of electronically controlled switch 250, and a first end of electric coil 260, the junction being denoted 245. The second end of electric coil 260, denoted with a dot for polarity, is connected to the second end of capacitor 270, and the second end of capacitor 280. A first end of output capacitor 50 is connected to a first end of electric coil 150 and the second end of output capacitor 50 is connected to a first end of electric coil 310, to a first end of electric coil 320 denoted with a dot for polarity, and the common point. The second end of electric coil 150, denoted with a dot for polarity, is connected to the cathode of diode 130 and the cathode of diode 140. The second end of electric coil 310, denoted with a dot for polarity, is connected to the anode of diode 130 and the second end of electric coil 320 is connected to the anode of diode 140. A first end of electric coil 190, denoted with a dot for polarity, is connected to the drain of electronically controlled switch 70 and a first end of capacitor 90. The second end of electric coil 190 is connected to the drain of electronically controlled switch 60 and a first end of capacitor 80. The source of electronically controlled switch 60 is connected to the second end of capacitor 80, the second end of capacitor 90, the source of electronically controlled switch 70 and the common point. Electric coils 260, 310, 320 and 190 are magnetically coupled. Capacitors 270 and 280 are arranged to provide a voltage divider for input voltage VIN, the voltage at the second end of electric coil 260 is thus maintained at VIN/2.

FIG. 9B shows a graph of the operation of half bridge converter 560 of FIG. 9A, where the x-axis represents time and the y-axis represents voltage in arbitrary units. The graph of FIG. 9B illustrates: the gate-source voltages of electronically controlled switches 60, 70, 240, and 250; and voltage VL. For the sake of simplicity the operation of FIGS. 9A and 9B will be described together.

In operation, at time T1 voltage VL is VIN/2, the potential at junction 245 thus being VIN. Electronically controlled switch 240 is switched on, the switching thereof being accomplished at ZVS since the voltage there across is zero. Electronically controlled switch 70 is on and electronically controlled switch 60 is off.

At time T2 electronically controlled switch 240 is switched off. The potential at junction 245 begins to drop, responsive to the discharging of the capacitance of junction 245, reaching VIN/2 at time T3, i.e. voltage VL becomes zero at time T3. When voltage VL becomes zero, the voltage across electric coil 190 is also zero. Since the voltage across electronically controlled switch 70 is zero, the voltage across electronically controlled switch 60 is also zero. Electronically controlled switch 60 is switched on, the switching thereof being accomplished at ZVS, since the voltage there across is zero. The current flowing through electric coil 150 is reflected to electric coil 190.

At time T4 electronically controlled switch 70 is switched off. The voltage at junction 245 continues to drop, responsive to the discharging of the capacitance of junction 245, reaching zero at time T5, i.e. voltage VL becomes −VIN/2. At time T5 electronically controlled switch 250 is switched on, the switching on thereof being ZVS since the voltage there across is zero. Operation from time T5 to T9 is completely symmetric with the operation from times T1 to T5.

At time T6 electronically controlled switch 250 is switched off thereby the voltage at junction 245 begins to rise, responsive to the charging of the capacitance of junction 245, reaching VIN/2 at time T7, i.e. voltage VL becomes zero at time T7. Since voltage VL is zero, the voltage across electric coil 190 is also zero. Since the voltage across electronically controlled switch 60 is zero, the voltage across electronically controlled switch 70 is also zero. Electronically controlled switch 70 is switched on, the switching thereof being accomplished at ZVS, since the voltage there across is zero. The current flowing through electric coil 150 is reflected to electric coil 190.

At time T8 electronically controlled switch 60 is switched off and the voltage at junction 245 continues to rise, responsive to the charging of the capacitance of junction 245, reaching VIN at time T9, and voltage VL across electric coil rises, reaching VIN/2. Electronically controlled switch 240 is switched on at time T9, the switching on thereof being accomplished at ZVS since the voltage there across is zero.

FIG. 10A illustrates a high level schematic diagram of a push-pull converter 600, exhibiting synchronous rectification with a plurality of magnetically coupled electric coils according to certain embodiments. The construction of push-pull converter 600 is similar to the construction of push-pull converter 550 of FIG. 8A, except that diodes 130 and 140 are replaced with electronically controlled switches 130 and 140, and the inductance of electric coil 150 is selected so that current will become negative during each half cycle. In one embodiment electronically controlled switches 130 and 140 are each constituted of an NMOSFET. The source of electronically controlled switch 130 is connected to the first end of electric coil 310 and the source of electronically controlled switch 140 is connected to the second end of electric coil 320. The drain of electronically controlled switch 130 is connected to the drain of electronically controlled switch 140 and the first end of electric coil 150. Electric coils 40, 160, 310, and 320 are magnetically coupled to each other, and electric coils 150 and 190 are separately magnetically coupled to each other. For the sake of simplicity, push-pull converter 600 will be described where the winding ratio between each pair of magnetically coupled electric coils is 1:1. Electric coils 40, 160, 310, and 320 are arranged such that the polarities at the first end of electric coil 40, the second end of electric coil 160, the first end of electric coil 310, and the first end of electric coil 320, are the same. Electric coils 150 and 190 are arranged such that the polarities at the first end of electric coil 190 and the first end of electric coil 150 are the same. The voltage across electric coil 40, measured from the first end to the second end, is denoted VL and the current flowing through electric coil 150 is denoted IL.

FIG. 10B shows a graph of the operation of push-pull converter 600 of FIG. 10A, where the x-axis represents time and the y-axis represents voltage in arbitrary units. The graph of FIG. 10B illustrates: the gate-source voltages of electronically controlled switches 20, 60, 70, 130, 140, and 200; and voltage VL. For the sake of simplicity the operation of FIGS. 10A and 10B will be described together.

In operation, at time T1, voltage VL is VIN, the potential at junction 25 thus being zero. Electronically controlled switch 20 is switched on, the switching on thereof being accomplished at ZVS since the voltage there across is zero. Electronically controlled switches 60 and 130 are also on. At time T2 electronically controlled switch 20 is switched off. In one embodiment the on time of electronically controlled switch 20 is determined so as to insure the desired fixed output voltage VOUT. The voltage at junction 25 rises, responsive to the charging of the capacitance of junction 25, reaching VIN at time T3. Voltage VL is thus zero, as is the voltage across each of electric coils 160, 310, and 320. Since the voltages across each of electric coils 310 and 320 is zero, as is the voltage across electronically controlled switch 130, the voltage across electronically controlled switch 140 is also zero. Electronically controlled switch 140 is switched on at time T3, the switching on thereof being accomplished at ZVS since the voltage there across is zero.

Since electronically controlled switches 130 and 140 are on, current IL flows through electronically controlled switches 130 and 140, which function to place a short circuit across series connected electric coils 310, 320. The voltage across electric coil 150 is −VOUT, thus current IL decreases, becoming negative at time T4. In one preferred embodiment the on time of electronically controlled switch 130 is selected such that negative current IL, at time T5 which will be described further below, reaches a value which will allow the voltage across electric coil 320 to rise to VIN while taking into account the magnetizing current. At time T5 electronically controlled switch 130 is switched off. Current IL now flows through electronically controlled switch 140 and electric coil 320. The negative current IL flowing through electric coil 320 causes the voltage there across, measured from the source of electronically controlled switch 140 to the common point, to increase, thereby causing a reduction in voltage VL and an increase of voltage across electric coil 160. Thus the voltage at junction 25 increases and the voltage at junction 205 decreases.

As the voltage across electric coil 320 increases, the voltage across electric coil 150, measured from the drain of electronically controlled switch 130 to the output, decreases. At time T6 the voltage across electric coil 320 is VOUT and the voltage across electric coil 150 is zero. The voltage across electric coil 190 is therefore also zero, and since the voltage across electronically controlled switch 60 is also zero, the voltage across electronically controlled switch 70 is zero. Electronically controlled switch 70 is thus switched on at time T6, the switching on thereof being accomplished at ZVS since the voltage there across is zero. Negative current IL is thus reflected to electric coil 190. and maintains a fixed value. Additionally, the voltage across electric coil 320 is clamped at VOUT, therefore voltage VL is clamped at −VOUT.

At time T7 electronically controlled switch 60 is switched off, unclamping voltage VL. The voltage across electric coil 320 continues to rise. At time T8 the voltage across electric coil 320 reaches VIN, therefore the voltage at junction 205 is zero and the voltage at junction 25 is 2*VIN. Electronically controlled switch 200 is thus switched on at time T7, the switching on thereof being accomplished at ZVS since the voltage there across is zero. Voltage VL is then clamped at −VIN. Thus, a first half of a cycle of the operation of push-pull converter 600 is completed. The second half of the cycle is symmetrical to the first and will not be described, for the sake of brevity.

Since the minimal value of the negative current IL formed is not a function of the output current, zero voltage switching of electronically controlled switches 20, 60, 70, 130, 140, and 200 is achieved with any load and advantageously electronically controlled switches 60, 70 do not participate in the energy transfer associated with electric coil 40.

Figure 11A:
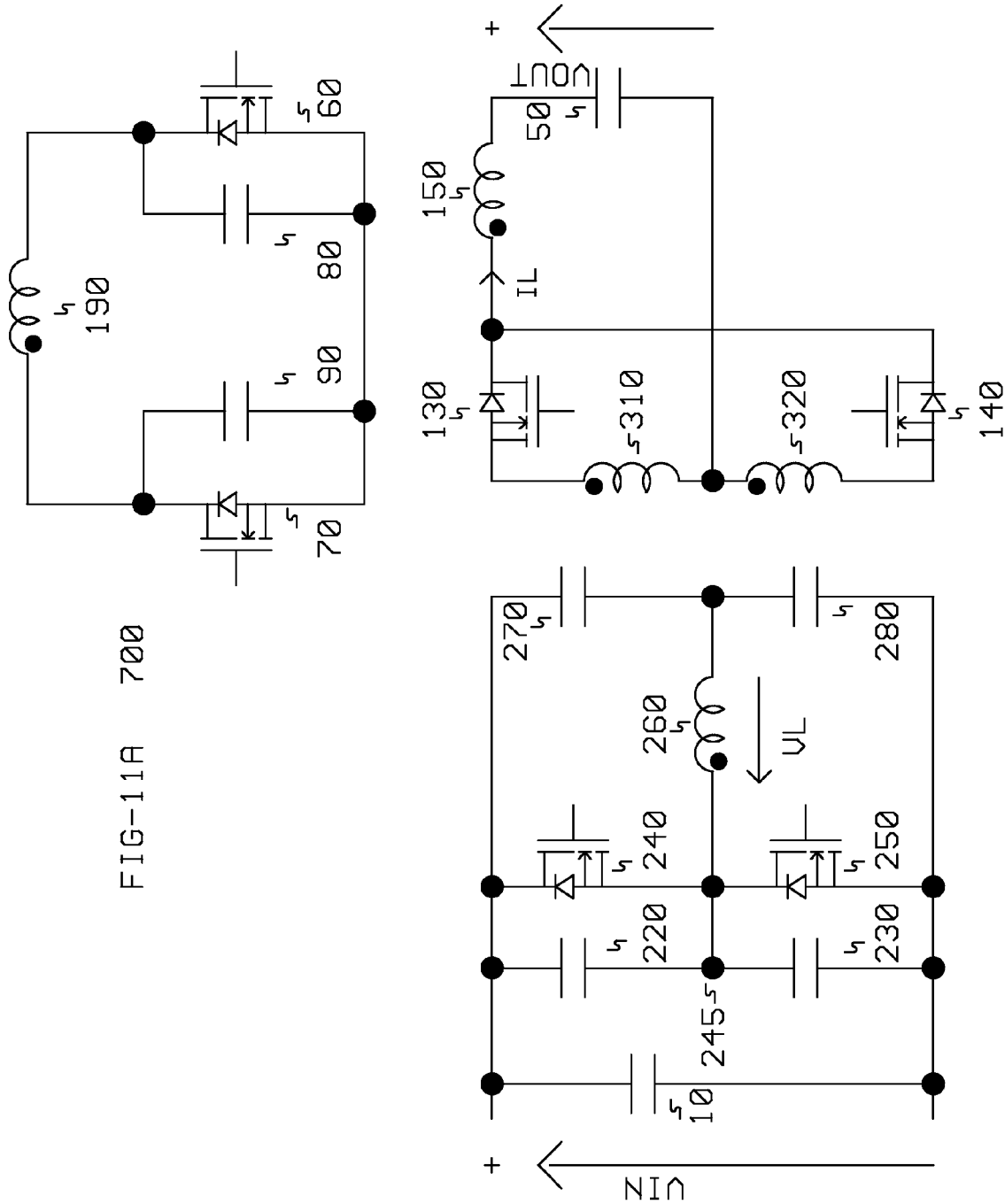
FIG. 11A illustrates a high level schematic diagram of a half bridge converter with a plurality of magnetically coupled electric coils, with synchronous rectifiers at the output, according to certain embodiments.

FIG. 11A illustrates a high level schematic diagram of a half bridge converter 700 with an additional electric coil magnetically coupled with the storage element electric coil, with synchronous rectification, according to certain embodiments. The construction of half bridge converter 700 is similar to the construction of half bridge phase shift converter 560 of FIG. 9A, with the exception that diodes 130 and 140 are replaced with electronically controlled switches 130 and 140, and the inductance of electric coil 150 is selected so that current will become negative during each half cycle. Electronically controlled switches 130 and 140 are in one embodiment each constituted of an NMOSFET. The source of electronically controlled switch 130 is connected to the second end of electric coil 310 and the source of electronically controlled switch 320 is connected to the second end of electric coil 320. The drain of electronically controlled switch 130 is connected to the drain of electronically controlled switch 140 and the second end of electric coil 150. Electric coil 260 is magnetically coupled to electric coils 310 and 320, in one embodiment electric coil 260 being the primary winding of a transformer and electric coils 310 and 320 being the secondary windings of the transformer. Electric coils 150 and 190 are separately magnetically coupled. Electric coils 260, 310, and 320 are arranged such that the polarities at the second end of electric coil 310, the first end of electric coil 320, and the first end of electric coil 260 are the same. Electric coils 150 and 190 are arranged such that the polarities at the second end of electric coil 150 and the first end of electric coil 190 are the same. Voltage VL is the voltage drop across electric coil 260, measured from the first end thereof to the second end thereof.

FIG. 11B shows a graph of the operation of half bridge converter 700 of FIG. 11A, where the x-axis represents time and the y-axis represents voltage in arbitrary units. The graph of FIG. 11B illustrates: the gate-source voltages of electronically controlled switches 60, 70, 130, 140, 240 and 250; and voltage VL. For the sake of simplicity the operation of FIGS. 11A and 11B will be described together.

In operation, at time T1, voltage VL is VIN/2, i.e. the potential at junction 245 is VIN. Electronically controlled switch 240 is switched on; the switching on thereof being accomplished at ZVS since the voltage there across is zero. Voltage VL is thus clamped at VIN/2. Electronically controlled switches 60 and 130 are also on. At time T2 electronically controlled switch 240 is switched off. The on time of electronically controlled switch 240 is determined so as to insure the desired output voltage VOUT. The voltage at junction 245 begins to drop, responsive to the discharging of the capacitance of junction 245, reaching VIN/2 at time T3. Voltage VL is thus zero, as is the voltage across each of electric coils 310 and 320. Electronically controlled switch 140 is switched on at time T3. Since the voltage across electric coils 310 and 320 are zero, as is the voltage across electronically controlled switch 130, the voltage across electronically controlled switch 140 is zero, thus the switching on thereof is accomplished at ZVS.

Since electronically controlled switches 130 and 140 are on, current IL flows through electronically controlled switches 130 and 140 which effectively place a short circuit across electric coils 310, 320, which in one embodiment represent the secondary windings of the transformer. The voltage across electric coil 150 is −VOUT, thus current IL decreases. At time T4 current IL reaches zero. IL continues to decrease, and at time T5 current IL has reached a negative value which will allow the voltage across electric coil 320 to rise to VIN/2 while taking into account the magnetizing current as will be described further hereinto below. At time T5 electronically controlled switch 130 is switched off. Current IL now flows through electronically controlled switch 140 and electric coil 320. The negative current IL flowing through electric coil 320 causes the voltage there across as measured from the source of electronically controlled switch 140 to the common point to increase, thereby causing a reduction in voltage VL. Thus the potential at junction 245 thus decreases.

As the voltage across electric coil 320 increases, the voltage across electric coil 150, measured from the drain of electronically controlled switch 130 to the output, decreases. At time T6 the voltage across electric coil 320 is VOUT and the voltage across electric coil 150 is zero. The voltage across electric coil 190 is also zero, and since the voltage across electronically controlled switch 60 is also zero, the voltage across electronically controlled switch 70 is zero. Electronically controlled switch 70 is switched on at time T6, the switching on thereof being accomplished at ZVS since the voltage there across is zero. Negative current IL is thus reflected to electric coil 190 and maintains a fixed value. Additionally, the voltage across electric coil 320 is clamped at VOUT, therefore voltage VL is clamped at −VOUT.

At time T7 electronically controlled switch 60 is switched off, unclamping voltage VL. The voltage across electric coil 320 continues to rise. At time T8 the voltage across electric coil 320 reaches VIN/2, therefore the voltage at junction 245 is zero. Electronically controlled switch 250 is then switched on; the switching on thereof being at ZVS since the voltage there across is zero. Thus, a first half of a cycle of the operation of half bridge converter 700 is completed. The second half of the cycle is symmetrical to the first and will not be described, for the sake of brevity.

Since the negative current IL formed is not a function of the output current, zero voltage switching of electronically controlled switches 60, 70, 130, 140, 240, and 250 is achieved with any load, and advantageously electronically controlled switches 60 and 70 do not participate in the energy transfer associated with electric coil 260.

Figure 12:
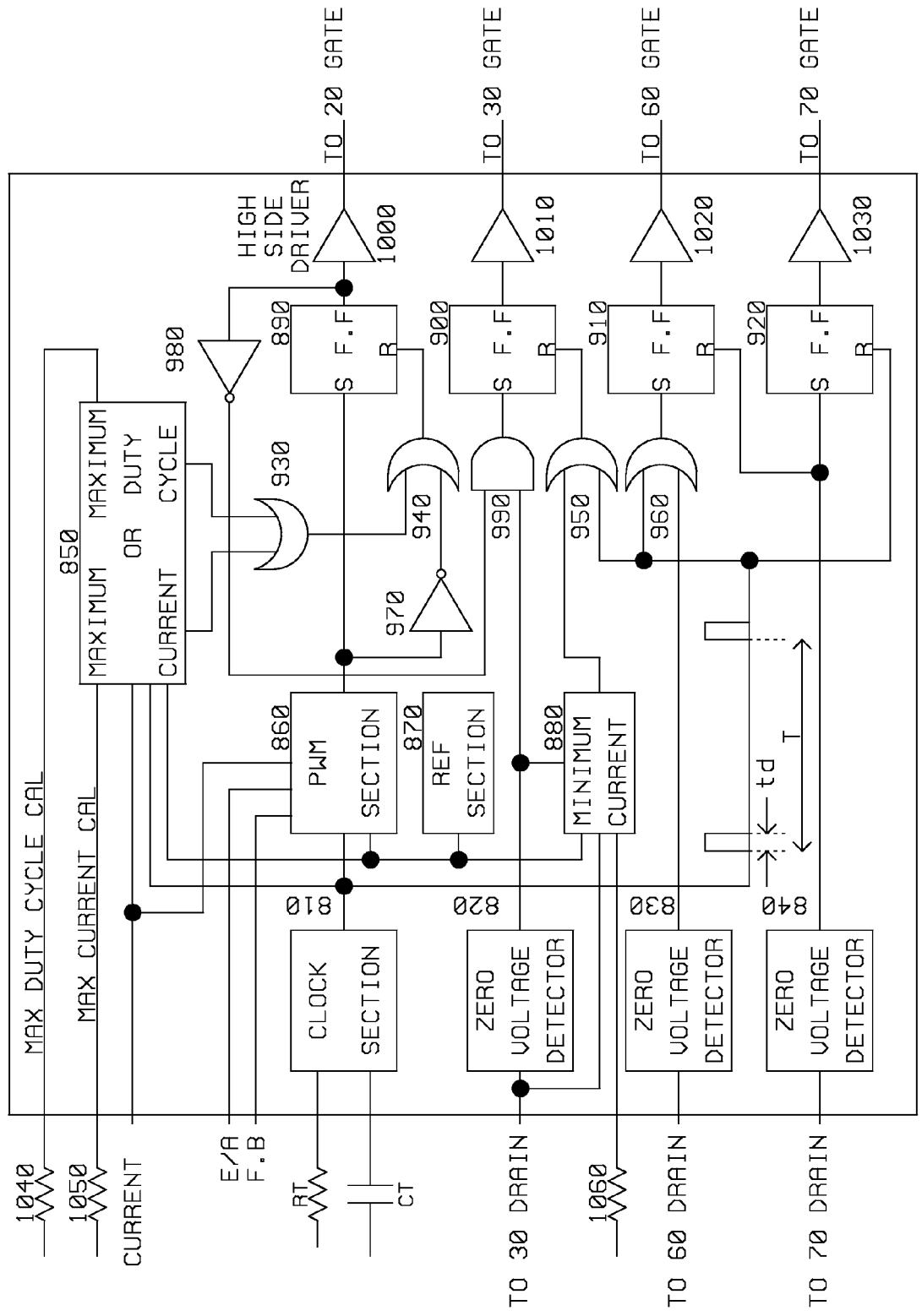
FIG. 12 illustrates a high level schematic diagram of a control circuitry according to certain embodiments, suitable for the synchronous buck converter of FIG. 3A.

FIG. 12 illustrates a high level schematic diagram of a control circuitry 800 according to certain embodiments, suitable for control of synchronous buck converter 155 of FIG. 3A, and with the appropriate logical modifications may be used with any of the converters of FIGS. 2A-11. Control circuitry 800 comprises: a clock section 810; a plurality of zero voltage detectors 820, 830, and 840; a maximum current or maximum duty cycle functionality 850; a PWM section 860; an REF section 870; a minimum current functionality 880; a plurality of flip-flops (F.F.) 890, 900, 910, and 920; a plurality of OR gates 930, 940, 950, and 960; a pair of inverters 970 and 980; an AND gate 990; and a plurality of buffers 1000, 1010, 1020, and 1030. External to control circuitry 800 are: a plurality of resistors 1040, 1050, 1060, and RT; and a capacitor CT. Flip-flops 890, 900, 910, and 920 are in one embodiment S-R flip-flops.

A first end of resistor RT is connected to a first input of clock section 810 and a first end of capacitor CT is connected to a second input of clock section 810, with the second end of each of resistor RT and capacitor CT typically being connected to ground. The output of clock section 810 is connected to a first input of maximum current or maximum duty cycle functionality 850, a first input of PWM section 860, the reset input of F.F. 920, a first input of OR gate 950, and a first input of OR gate 960. The input of each of zero voltage detectors 820, 830, and 840 is connected to the drain of electronically controlled switches 30, 60, and 70, respectively, of synchronous buck converter 155 of FIG. 3A. The output of zero voltage detector 820 is connected to a first input of minimum current functionality 880 and a first input of AND gate 990. The output of zero voltage detector 830 is connected to a second input of OR gate 960. The output of zero voltage detector 840 is connected to the reset input of F.F. 910 and the set input of F.F. 920. A first end of each of resistors 1040 and 1050 are connected to a second and third input, respectively, of maximum current or maximum duty cycle functionality 850, with the second end of each of resistors 1040 and 1050 typically being connected to ground. A fourth input of maximum current or maximum duty cycle functionality 850 is connected to a voltage representation of current IL. A first output of maximum current or maximum duty cycle functionality 850 is connected to a first input of OR gate 930 and a second output of maximum current or maximum duty cycle functionality 850 is connected to a second input of OR gate 930.

A first input of PWM section 860 is connected to the voltage representation of current IL. A second input of PWM section 860 is connected to the output of error amplifier E/A of synchronous buck converter 155 and a third input of PWM section 860 is connected to the input of the error amplifier, denoted F.B. The output of PWM section 860 is connected to the set input of F.F. 890 and the input of inverter 970. The output of REF section 870 is connected to a fifth input of maximum current or maximum duty cycle functionality 850, a fifth input of PWM section 860 and a second input of minimum current functionality 880. A first end of resistor 1060 is connected to a third input of minimum current functionality 880, with the second end of resistor 1060 typically being connected to ground. A fourth input of minimum current functionality 880 is connected to the drain of electronically controlled switch 30. The output of minimum current functionality 880 is connected to a second input of OR gate 950. The output of OR gate 930 is connected to a first input of OR gate 940. The second input of OR gate 940 is connected to the output of inverter 970 and the output of OR gate 940 is connected to the reset input of F.F. 890. The second input of AND gate 990 is connected to the output of inverter 980 and the output of AND gate 990 is connected to the set input of F.F. 900. The output of OR gate 950 is connected to the reset input of F.F. 900 and the output of OR gate 960 is connected to the set input of F.F. 910. The output of F.F. 890 is connected to the input of inverter 980 and to the gate of electronically controlled switch 20, via buffer 1000. The output of F.F. 900 is connected to the gate of electronically controlled switch 30, via buffer 1010; the output of F.F. 910 is connected to the gate of electronically controlled switch 60, via buffer 1020; and the output of F.F. 920 is connected to the gate of electronically controlled switch 70, via buffer 1030.

Resistor 1040 is used by maximum current or maximum duty cycle functionality 850 to determine, in cooperation with the output of REF section 870, the maximum allowed duty cycle and resistor 1050 is used by maximum current or maximum duty cycle functionality 850 to determine, in cooperation with the output of REF section 870, the maximum allowed current. Resistor 1060 is used by minimum current functionality to determine, in cooperation with the output of REF section 870, the minimal current necessary to achieve zero voltage switching of electronically controlled switch 20 as described above.

In operation, if, during the period between time T1 and time T2, current IL rises to a pre-determined value, or if a pre-determined duty cycle of the converter has been reached, maximum current or maximum duty cycle functionality 850 is operative, via OR gates 930 and 940, to reset F.F. 890, thereby turning off electronically controlled switch 20. Current IL will then begin to decrease when voltage VL becomes negative, as described above. The on time of electronically controlled switch 20 is further controlled by PWM section 860, responsive to the sensed value of current IL and the output of error amplifier E/A. Thus, F.F. 890 is pulse width modulated accordingly, thereby adjusting the duty cycle of the pulse width modulation of electronically controlled switch 20, to achieve the preset values.

As described above, at time T3 electronically controlled switch 30 is switched on. Time T3 is determined by zero voltage detector 820, responsive to the drain voltage of electronically controlled switch 30 becoming zero, i.e. when the drain voltage becomes zero, zero voltage detector 820 outputs a high voltage to AND gate 990. If the output of F.F. 890 is zero, i.e. electronically controlled switch 20 is off, both inputs of AND gate 980 will be high, thereby setting F.F. 900. Electronically controlled switch 30 is thus switched on, as described above. When at time T5 current IL has reached the desired minimal value, as described above, minimum current functionality 880 is operative to reset F.F. 900, via OR gate 950, thereby turning off electronically controlled switch 30. Minimum current functionality 880 is operative to turn off electronically controlled switch 30 only when the drain voltage of electronically controlled switch 30 is zero and the output of zero voltage detector 820 is high, i.e. at time T5.

As described above, at time T3 the voltage across electronically controlled switch 70 becomes zero. Zero voltage detector 840 is operative to set F.F. 920 and reset F.F. 910, thereby turning off electronically controlled switch 60 and turning on electronically controlled switch 70, via buffers 1020 and 1030, respectively. As described above, at time T6 the voltage across electronically controlled switch 60 is zero. Zero voltage detector 830 is operative to set F.F. 910, thereby turning on electronically controlled switch 60 via buffer 1020.

Thus is provided in certain embodiments an arrangement in which current flow in the electric coil of a converter is maintained by a short circuit condition associated with the electric coil, the short circuit condition being achieved without reference to the switches used to perform the energy transfer functionality of the power converter. This condition is maintained to achieve a zero voltage switching condition. In an exemplary embodiment, a second electric coil is provided, magnetically coupled with the electric coil, and the short circuit condition is created across the second electric coil.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

I claim:

1. A power converter comprising:
a control circuitry arranged to control the power converter at a fixed frequency;
a first electric coil, a first end of said first electric coil connected to an input of the power converter and a second end of said first electric coil connected to an output of the power converter, at least one of said connection to the input and said connection to the output being a non-switchable connection;
a first electronically controlled switch associated with said first electric coil and responsive to said control circuitry, said first electronically controlled switch arranged, responsive to a closed state of said first electronically controlled switch, to produce a current flowing in a first direction in said first electric coil so as to charge said first electric coil in the first direction, in cooperation with an input voltage; and
a second electronically controlled switch associated with said first electric coil and responsive to said control circuitry, said second electronically controlled switch at all times arranged, responsive to a closed state of said second electronically controlled switch, to discharge said first electric coil when said first electric coil exhibits a current flowing in said first direction and to contiguously charge said first electric coil in a second direction, opposing said first direction, so as to produce a current flowing in said second direction in said first electric coil; and
a third electronically controlled switch associated with said first electric coil, and responsive to said control circuitry, said third electronically controlled switch arranged, responsive to a closed state of said third electronically controlled switch, to present a substantially short circuit across said first electric coil, and said third electronically controlled switch not arranged to either charge or discharge said first electric coil, wherein said control circuitry is arranged to:
alternately open and close said first electronically controlled switch such that a current flowing in said first direction is produced in said first electric coil not substantially greater than a value determined responsive to a load;
alternately open and close said second electronically controlled switch such that a current flowing in said second direction is produced in said first electric coil and is sufficient to set the voltage across said first electronically controlled switch to zero when said second electronically controlled switch is open; and
alternately open and close said third electronically controlled switch so as to maintain the fixed frequency of the power converter regardless of the length of time wherein each of said first and second electronically controlled switches are closed,
wherein each of said first, second and third electronically controlled switches are closed only when substantially zero voltage is presented there across.

2. The power converter of claim 1, further comprising:
a second electric coil magnetically coupled to said first electric coil,
wherein said third electronically controlled switch is connected to said second electric coil to present a substantially short circuit across said second electric coil, responsive to a closed state of said third electronically controlled switch, said short circuit across said second electric coil reflected to said first electric coil thereby presenting said substantially short circuit across said first electric coil.

3. The power converter of claim 2, further comprising a fourth electronically controlled switch responsive to said control circuitry, said fourth electronically controlled switch arranged to cooperate with said third electronically controlled switch to present the substantially short circuit to the second electric coil, wherein said control circuitry is arranged to close said fourth electronically controlled switch only when substantially zero voltage is presented across said fourth electronically controlled switch.

4. The power converter of claim 1, wherein said control circuitry is arranged to present said substantial short circuit responsive to a predetermined non-zero value of current flowing through said first electric coil.

5. The power converter of claim 4, wherein said control circuitry comprises a pulse width modulation functionality exhibiting a period, and wherein said control circuitry is arranged to maintain said substantial short circuit until a predetermined time point in said period.

6. The power converter of claim 1, wherein the power converter is one of a buck converter, a boost converter, a flyback converter, a forward converter, a push-pull converter, and a half bridge converter.

7. A method of power conversion, the method comprising:
providing a first electric coil, a first end of said provided first electric coil connected to an input voltage and a second end of said provided first electric coil connected to a load, at least one of said connection to the input voltage and said connection to the load being a non-switchable connection;
providing a first electronically controlled switch, said provided first electronically controlled switch arranged, responsive to a closed state of said provided first electronically controlled switch, to produce a current flowing in a first direction in said provided first electric coil so as to charge said first electric coil in the first direction, in cooperation with an input voltage;
providing a second electronically controlled switch, said provided second electronically controlled switch at all times arranged, responsive to a closed state of said provided second electronically controlled switch, to discharge said provided first electric coil when said provided first electric coil exhibits a current flowing in said first direction and to contiguously charge said first electric coil in a second direction, opposing said first direction, so as to produce a current flowing in said second direction in said provided first electric coil;
providing a third electronically controlled switch,
said provided third electronically controlled switch arranged, responsive to a closed state of said third electronically controlled switch, to present a substantially short circuit across said provided first electric coil, and
said provided third electronically controlled switch not arranged to either charge or discharge said provided first electric coil;
alternately opening and closing said provided first electronically controlled switch such that a current flowing in said first direction is produced in said provided first electric coil not substantially greater than a value determined by the load;
alternately opening and closing said second electronically controlled switch such that a current flowing in said second direction is produced in said provided first electric coil and is sufficient to set the voltage across said provided first electronically controlled switch to zero when said provided second electronically controlled switch is open; and
alternately opening and closing said provided third electronically controlled switch so as to maintain a fixed frequency of the power conversion regardless of the length of time wherein each of said provided first and second electronically switches are closed,
wherein said closing of each of said provided first, second and third electronically controlled switches is only when substantially zero voltage is presented there across.

8. The method of claim 7, further comprising:
providing a second electric coil magnetically coupled to said provided first electric coil,
wherein said provided third electronically controlled switch is arranged to present a substantially short circuit across said provided second electric coil responsive to a closed state of said provided third electronically controlled switch, and
wherein said substantially short circuit across said first electric coil is presented reflective of a substantially short circuit presented across said provided second electric coil.

9. The method of claim 8, further comprising:
providing a fourth electronically controlled switch,
wherein said substantially short circuit presented across said provided second electric coil is at least partially responsive to a closed state of said provided fourth electronically controlled switch, and
wherein said closed state of said provided fourth electronically controlled switch is entered only when substantially zero voltage is presented across said provided fourth electronically controlled switch.

10. The method of claim 7, wherein said maintaining a fixed frequency of the power conversion comprises maintaining said substantial short circuit until a predetermined time point in the time period of said fixed frequency.

11. A power converter comprising:
a control circuitry arranged to control the power converter at a fixed frequency;
an inductive means for energy transfer, a first end of said inductive means for energy transfer connected to an input of the power converter and a second end of said inductive means for energy transfer connected to an output of the power converter, at least one of said connection to the input and said connection to the output being a non-switchable connection;
a first electronically controlled switch associated with said inductive means for energy transfer and responsive to said control circuitry, said first electronically controlled switch arranged, responsive to a closed state of said first electronically controlled switch, to produce a current flowing in a first direction in said inductive means for energy transfer so as to charge said inductive means for energy transfer in the first direction, in cooperation with an input voltage;
a second electronically controlled switch associated with said inductive means for energy transfer and responsive to said control circuitry, said second electronically controlled switch at all times arranged, responsive to a closed state of said second electronically controlled switch, to discharge said inductive means for energy transfer when said inductive means for energy transfer exhibits a current flowing in said first direction and to contiguously charge said inductive means for energy transfer in a second direction, opposing said first direction, so as to produce a current flowing in said second direction in said inductive means for energy transfer; and
a third electronically controlled switch associated with said inductive means for energy transfer and responsive to said control circuitry,
said third electronically controlled switch arranged, responsive to a closed state of said third electronically controlled switch, to present a substantially short circuit across said inductive means for energy transfer, and
said third electronically controlled switch not arranged to either charge or discharge said inductive means for energy transfer,
wherein said control circuitry is arranged to:
alternately open and close said first electronically controlled switch such that a current flowing in said first direction is produced in said inductive means for energy transfer not substantially greater than a value determined by a load;

alternately open and close said second electronically controlled switch such that a current flowing in said second direction is produced in said inductive means for energy transfer and is sufficient to set the voltage across said first electronically controlled switch to zero when said second electronically controlled switch is open; and alternately open and close said third electronically controlled switch so as to maintain the fixed frequency of the power converter regardless of the length of time wherein each of said first and second electronically controlled switches are closed, wherein each of said first, second and third electronically controlled switches are closed only when substantially zero voltage is presented there across.

* * * * *